US012087493B2

(12) United States Patent
Yoshioka

(10) Patent No.: US 12,087,493 B2
(45) Date of Patent: Sep. 10, 2024

(54) INDUCTOR COMPONENT, METHOD FOR MANUFACTURING INDUCTOR COMPONENT, AND INDUCTOR STRUCTURE

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 643 days.

(21) Appl. No.: 17/246,584

(22) Filed: Apr. 30, 2021

(65) Prior Publication Data

US 2021/0358679 A1 Nov. 18, 2021

(30) Foreign Application Priority Data

May 13, 2020 (JP) ................................ 2020-084562

(51) Int. Cl.
*H01F 27/28* (2006.01)
*H01F 27/24* (2006.01)
*H01F 27/29* (2006.01)
*H01F 41/06* (2016.01)

(52) U.S. Cl.
CPC ......... *H01F 27/2828* (2013.01); *H01F 27/24* (2013.01); *H01F 27/29* (2013.01); *H01F 41/06* (2013.01)

(58) Field of Classification Search
CPC ...... H01F 27/2828; H01F 27/24; H01F 27/29; H01F 2017/048; H01F 17/0013; H01F 27/2823
USPC ........................................ 336/192, 198, 200
See application file for complete search history.

(56) References Cited

U.S. PATENT DOCUMENTS 7,119,648 B1* 10/2006 Herbert .................. H01F 30/06 363/24
11,562,845 B2* 1/2023 Kasper .................... H01F 17/06
2004/0179383 A1* 9/2004 Edo ..................... H01F 27/2804 363/111
2014/0176286 A1* 6/2014 Okada ................. H01F 17/0013 336/200

(Continued)

FOREIGN PATENT DOCUMENTS

JP 2012-222252 A 11/2012
JP 2016009833 A 1/2016

(Continued)

*Primary Examiner* — Shawki S Ismail
*Assistant Examiner* — Kazi S Hossain
(74) *Attorney, Agent, or Firm* — Studebaker & Brackett PC

(57) ABSTRACT

An inductor component is configured such that a lower surface of a first magnetic layer serves as a first terminal surface. A first inductor wire is disposed in the first magnetic layer. The first inductor wire is cylindrical and extends in an up-down direction. A boundary portion is connected to a first internal terminal of the first inductor wire. An upper surface of a second magnetic layer serves as a second terminal surface. A second inductor wire is disposed in the second magnetic layer. The second inductor wire is columnar and extends in the up-down direction. A second internal terminal of the second inductor wire is connected to the boundary portion. The boundary portion serves as a physical boundary between the first inductor wire and the second inductor wire.

20 Claims, 20 Drawing Sheets

(56) References Cited

U.S. PATENT DOCUMENTS

| | | | | |
|---|---|---|---|---|
| 2015/0048918 | A1* | 2/2015 | Park | H01F 17/0013 336/200 |
| 2018/0075965 | A1* | 3/2018 | Yoshioka | H01F 27/2823 |
| 2020/0303113 | A1* | 9/2020 | Yang | H01F 27/28 |

FOREIGN PATENT DOCUMENTS

| | | | |
|---|---|---|---|
| WO | 2018/139046 | A1 | 8/2018 |
| WO | 2019/082714 | A1 | 5/2019 |

* cited by examiner

INDUCTOR COMPONENT, METHOD FOR MANUFACTURING INDUCTOR COMPONENT, AND INDUCTOR STRUCTURE

CROSS-REFERENCE TO RELATED APPLICATION

This application claims benefit of priority to Japanese Patent Application No. 2020-084562, filed May 13, 2020, the entire content of which is incorporated herein by reference.

BACKGROUND

Technical Field

The present disclosure relates to an inductor component, a method for manufacturing the inductor component, and an inductor structure.

Background Art

Japanese Unexamined Patent Application Publication No. 2016-009833 describes an inductor component including an annular coil core disposed in an insulating resin layer. An inductor wire is also disposed in the insulating resin layer. The inductor wire is helically wound around the annular coil core along the circumferential direction of the coil core. A first external terminal provided at a first end of the inductor wire is exposed at a mounting surface of the insulating resin layer. The mounting surface is an outer surface of the insulating resin layer that is adjacent to a substrate on which the inductor component is mounted. A second external terminal provided at a second end of the inductor wire is exposed at the same mounting surface as the mounting surface at which the first external terminal is exposed.

SUMMARY

Two inductor components may be mounted on a substrate such that the inductor wires thereof are connected in series. In such a case, when the inductor components each have the configuration described in Japanese Unexamined Patent Application Publication No. 2016-009833, both ends of each inductor wire are exposed at the same mounting surface. Therefore, the two inductor components need to be arranged next to each other on the same surface of the substrate, and the wires need to be connected in the substrate. Accordingly, to enable the two inductor components to be arranged next to each other on the substrate, the substrate is required to have at least an area for receiving the two inductor components.

Therefore, preferred embodiments of the present disclosure provide an inductor component which includes a body including a first magnetic layer made of a magnetic material and a second magnetic layer laminated on the first magnetic layer and made of a magnetic material. The body has a first terminal surface and a second terminal surface at a side opposite to the first terminal surface in a lamination direction in which the first magnetic layer and the second magnetic layer are laminated. The inductor component also includes a first inductor wire that extends linearly in the lamination direction in the first magnetic layer; a first external terminal provided at a first end of the first inductor wire and exposed only at the first terminal surface; and a first internal terminal provided at a second end of the first inductor wire, with the second end being opposite to the first end of the first inductor wire. The inductor component further includes a second inductor wire that extends linearly in the lamination direction in the second magnetic layer; a second internal terminal provided at a first end of the second inductor wire; a second external terminal provided at a second end of the second inductor wire and exposed only at the second terminal surface, with the second end being opposite to the first end of the second inductor wire; and a boundary portion that connects the first internal terminal and the second internal terminal to each other and serves as a physical boundary between the first inductor wire and the second inductor wire.

In addition, according to preferred embodiments of the present disclosure, an inductor structure includes an inductor component, an input wire, and an output wire. The inductor component includes a body including a first magnetic layer made of a magnetic material and a second magnetic layer laminated on the first magnetic layer and made of a magnetic material, with the body having a first terminal surface and a second terminal surface at a side opposite to the first terminal surface in a lamination direction in which the first magnetic layer and the second magnetic layer are laminated. The inductor component also includes a first inductor wire that extends linearly in the lamination direction in the first magnetic layer; a first external terminal provided at a first end of the first inductor wire and exposed only at the first terminal surface; and a first internal terminal provided at a second end of the first inductor wire, with the second end being opposite to the first end of the first inductor wire. The inductor component further includes a second inductor wire that extends linearly in the lamination direction in the second magnetic layer; a second internal terminal provided at a first end of the second inductor wire; a second external terminal provided at a second end of the second inductor wire and exposed only at the second terminal surface, with the second end being opposite to the first end of the second inductor wire; and a boundary portion that connects the first internal terminal and the second internal terminal to each other and serves as a physical boundary between the first inductor wire and the second inductor wire. An input wire from which an input voltage is supplied to the first external terminal of the inductor component. An output wire to which an output voltage is supplied from the second external terminal of the inductor component. A connection end of the input wire that is connected to the first external terminal and a connection end of the output wire that is connected to the second external terminal at least partially overlap when viewed in the lamination direction.

According to the above-described structure, the first inductor wire and the second inductor wire, which extend linearly in the lamination direction, are connected to each other in series by the boundary portion. The first external terminal is exposed only at the first terminal surface located at a first side in the lamination direction, and the second external terminal is exposed only at the second terminal surface located at a second side in the lamination direction. Therefore, the inductor component can be mounted on a substrate in a smaller mounting area than when two inductor wires composed of different components are arranged next to each other on the same mounting surface of the substrate.

Furthermore, according to preferred embodiments of the present disclosure, a method for manufacturing an inductor component includes a first-inductor-wire forming step of forming a first inductor wire that linearly extends through a first magnetic layer; a second-inductor-wire forming step of forming a second inductor wire that linearly extends through a second magnetic layer; and a boundary-portion forming step of forming a boundary portion that connects an end portion of the first inductor wire and an end portion of the second inductor wire to each other and that serves as a physical boundary between the first inductor wire and the second inductor wire. The method also includes a first-external-terminal forming step of forming a first external terminal that is exposed only at a first terminal surface located at a first side in a lamination direction in which the first magnetic layer and the second magnetic layer are laminated; and a second-external-terminal forming step of forming a second external terminal that is exposed only at a second terminal surface located at a second side in the lamination direction.

According to the above-described method, the first inductor wire and the second inductor wire, which extend linearly in the lamination direction, are connected to each other in series in the boundary-portion forming step. The manufactured inductor component is configured such that the first external terminal is exposed only at the first terminal surface located at the first side in the lamination direction and that the second external terminal is exposed only at the second terminal surface located at the second side in the lamination direction. Thus, the inductor component can be manufactured so that the mounting area thereof on a substrate is smaller than when two inductor wires composed of different components are arranged next to each other on the same mounting surface of the substrate.

Other features, elements, characteristics and advantages of the present disclosure will become more apparent from the following detailed description of preferred embodiments of the present disclosure with reference to the attached drawings.

DETAILED DESCRIPTION

Figure 1:
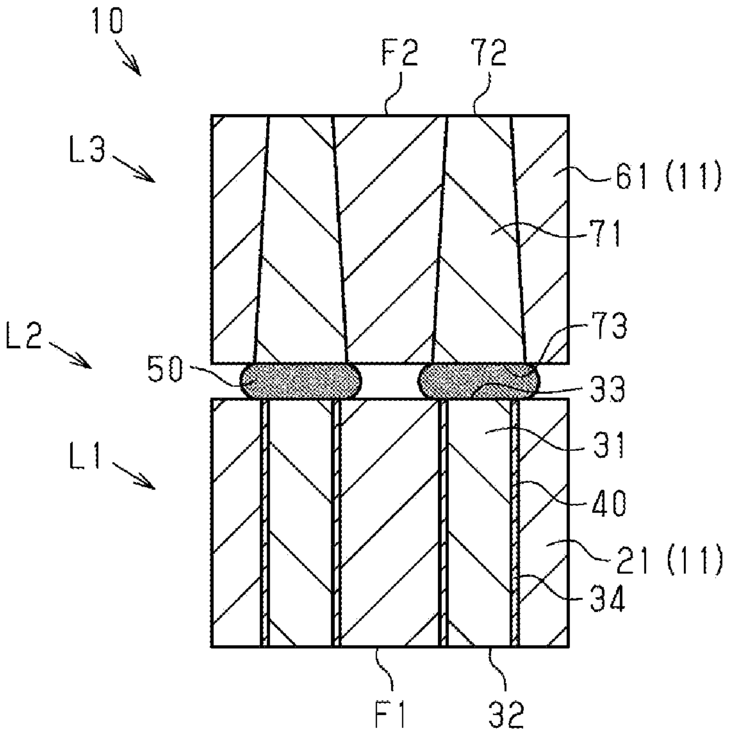
FIG. 1 is a sectional view of an inductor component according to a first embodiment.

Embodiments of an inductor component and a method for manufacturing the inductor component will now be described. In the drawings, constituent elements may be enlarged to facilitate understanding. The dimensional ratios between the constituent elements may differ from the actual ratios or those in other figures. In addition, only some of the components illustrated in the drawings may be denoted by reference signs.

First Embodiment

An inductor component and a method for manufacturing the inductor component according to a first embodiment will now be described.

Referring to FIG. 1, an inductor component 10 has a structure including three layers laminated in a thickness direction. In the following description, a lamination direction in which the three layers are laminated is referred to as an up-down direction.

A first layer L1 is substantially square when viewed in the up-down direction. The first layer L1 includes a first magnetic layer 21, first inductor wires 31, and insulating films 40.

The first magnetic layer 21 is made of a magnetic material, which is a resin containing magnetic metal powder, such as iron powder, and which has magnetic properties. The inductor component 10 is configured such that a surface of the first layer L1 at a lower side, which is a first side in the up-down direction, serves as a first terminal surface F1. In the present embodiment, the first layer L1 is the lowest layer in the up-down direction, and the first terminal surface F1 faces downward.

The first inductor wires 31 are disposed in the first magnetic layer 21. The first inductor wires 31 are made of a conductive material. In the present embodiment, the first inductor wires 31 have a composition containing about 99 wt % or more of copper. Although not illustrated, the first layer L1 includes four first inductor wires 31. When the first layer L1 is viewed in the up-down direction, two rows of first inductor wires 31, each row including two first inductor wires 31, are arranged in a direction in which a pair of opposing sides of the square extend.

The first inductor wires 31 are substantially cylindrical and extend linearly in the up-down direction, that is, in the lamination direction. The dimension of the first inductor wires 31 in the up-down direction is equal to the dimension of the first magnetic layer 21 in the up-down direction. Therefore, end surfaces of the first inductor wires 31 at the lower side, which is the first side in the up-down direction, are flush with and exposed only at the first terminal surface F1. In the present embodiment, the lower end surfaces of the first inductor wires 31 function as first external terminals 32. In other words, the first external terminals 32 are provided at first ends of the first inductor wires 31.

In addition, end surfaces of the first inductor wires 31 at an upper side, which is a second side opposite to the first side in the up-down direction, are flush with and exposed only at a surface of the first layer L1 at a side opposite to the first terminal surface F1. In the present embodiment, the upper end surfaces of the first inductor wires 31 function as first internal terminals 33. In other words, the first internal terminals 33 are provided at second ends of the first inductor wires 31.

Among the outer surfaces of the first inductor wires 31, side surfaces 34 other than the surfaces serving as the first external terminals 32 and the surfaces serving as the first internal terminals 33 are entirely covered with the insulating films 40. In the present embodiment, the side surfaces 34 are orthogonal to the first terminal surface F1. The insulating films 40 are made of an insulating material, which is an epoxy resin in the present embodiment. The insulating films 40 have a substantially uniform thickness.

The second layer L2 is provided on the upper surface of the first layer L1. In the present embodiment, the second layer L2 includes four boundary portions 50 and spaces between the boundary portions 50. The boundary portions 50 are connected to the first internal terminals 33 of the first layer L1. The boundary portions 50 are substantially cylindrical. When viewed in the up-down direction, the diameter of the boundary portions 50, which are substantially circular, is greater than the diameter of the first inductor wires 31. Accordingly, when viewed in the up-down direction, the boundary portions 50 entirely cover the first internal terminals 33.

Figure 2:
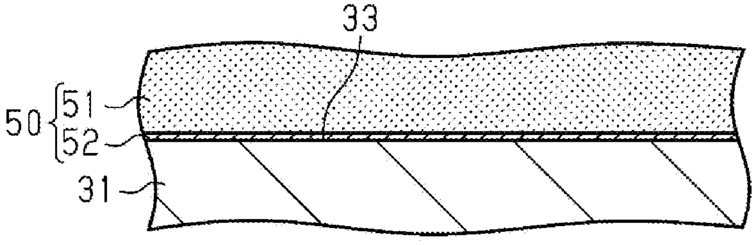
FIG. 2 is an enlarged sectional view of part of the inductor component according to the first embodiment including a boundary portion and a first inductor wire.

As illustrated in FIG. 2, each boundary portion 50 includes a solder portion 51 and an intermetallic compound portion 52. The solder portion 51 is made of a conductive material containing about 50 wt % or more and about 99 wt % or less (i.e., from about 50 wt % to about 99 wt %) of tin.

The intermetallic compound portion 52 is substantially layer-shaped and is thinner than the solder portion 51. The intermetallic compound portion 52 is made of an alloy of copper and tin. The intermetallic compound portion 52 is disposed between the first internal terminal 33 and the solder portion 51. Thus, the material of the boundary portion 50 differs from the material of the first inductor wire 31.

As illustrated in FIG. 1, the third layer L3 is laminated on the upper surface of the second layer L2. The third layer L3 is substantially square when viewed in the up-down direction. When viewed in the up-down direction, the length of each side of the third layer L3, which is substantially square, is equal to the length of each side of the first layer L1, which is also substantially square. In the present embodiment, the third layer L3 includes a second magnetic layer 61 and second inductor wires 71.

The material of the second magnetic layer 61 is the same as the material of the first magnetic layer 21. The inductor component 10 is configured such that a surface of the third layer L3 at the upper side, which is the second side in the up-down direction, serves as a second terminal surface F2, which is disposed adjacent to a circuit board when the inductor component 10 is mounted on the circuit board. In this embodiment, the second magnetic layer 61 of the third layer L3 and the first magnetic layer 21 of the above-described first layer L1 constitute a body 11 of the inductor component 10.

The second inductor wires 71 are disposed in the second magnetic layer 61. The second inductor wires 71 are made of the same material as the material of the first inductor wires 31. Although not illustrated, the third layer L3 includes four second inductor wires 71. The second inductor wires 71 are connected to the upper surfaces of the four boundary portions 50 of the second layer L2.

The second inductor wires 71 are substantially columnar and extend linearly in the up-down direction, that is, in the lamination direction. The dimension of the second inductor wires 71 in the up-down direction is substantially equal to the dimension of the first inductor wires 31 in the up-down direction. The second inductor wires 71 have a substantially circular cross section along a plane orthogonal to the up-down direction. The diameter of the cross section of each second inductor wire 71 along a plane orthogonal to the up-down direction decreases toward the upper side in the up-down direction. Accordingly, the cross-sectional area of each second inductor wire 71 along a plane orthogonal to the up-down direction decreases toward the upper side in the up-down direction. In the present embodiment, the minimum cross-sectional area at the upper end is equal to the cross-sectional area of each first inductor wire 31 along a plane orthogonal to the up-down direction. Thus, the second inductor wires 71 are tapered such that the diameter thereof decreases toward the upper side.

The dimension of the second inductor wires 71 in the up-down direction is equal to the dimension of the second magnetic layer 61 in the up-down direction. Therefore, end surfaces of the second inductor wires 71 at the upper side, which is the second side in the up-down direction, are flush with the second terminal surface F2 of the third layer L3. The end surfaces of the second inductor wires 71 at the upper side in the up-down direction are exposed only at the second terminal surface F2. In the present embodiment, the end surfaces of the second inductor wires 71 at the upper side in the up-down direction function as second external terminals 72. In other words, the second external terminals 72 are provided at second ends of the second inductor wires 71.

End surfaces of the second inductor wires 71 at the lower side, which is the first side in the up-down direction, are flush with a surface of the third layer L3 at a side opposite to the second terminal surface F2. The lower end surfaces of the second inductor wires 71 are exposed only at a surface of the second magnetic layer 61 at the side opposite to the second terminal surface F2. In the present embodiment, the lower end surfaces of the second inductor wires 71 function as second internal terminals 73. In other words, the second internal terminals 73 are provided at first ends of the second inductor wires 71 that are opposite to the second ends, and are located at the sides of the second inductor wires 71 adjacent to the boundary portions 50.

The second internal terminals 73 are connected to the boundary portions 50. The boundary portions 50 serve as physical boundaries between the first inductor wires 31 and the second inductor wires 71. Although not illustrated, each boundary portion 50 includes another intermetallic compound portion 52 that is formed between the solder portion 51 and a corresponding one of the second internal terminals 73. In the present embodiment, the thickness of the boundary portions 50, which is the dimension of the boundary portions 50 in the up-downs direction, is equal to the distance between the first internal terminals 33 and the second internal terminals 73 in the up-down direction. The thickness of the boundary portions 50 may be determined by measuring the distance between the first internal terminals 33 and the second internal terminals 73 on a cross section that is orthogonal to the first terminal surface F1 and that includes the first inductor wires 31, the boundary portions 50, and the second inductor wires 71. The thickness of the boundary portions 50 is greater than or equal to about one-tenth of the diameter of the smallest circles enclosing the end surfaces of the second inductor wires 71 at the first side. In the present embodiment, the end surfaces of the first inductor wires 31 at the second side are substantially circular and smaller than the end surfaces of the second inductor wires 71 at the first side. Therefore, the thickness of the boundary portions 50 is also greater than or equal to about one-tenth of the diameter of the smallest circles enclosing the end surfaces of the first inductor wires 31 at the second side.

The thickness of the boundary portions 50 is less than or equal to about one-third of the dimension of the first inductor wires 31 in the up-down direction. The thickness of the boundary portions 50 is also less than or equal to about one-third of the dimension of the second inductor wires 71 in the up-down direction.

In the present embodiment, the cross-sectional area of the first inductor wires 31 and the second inductor wires 71 along a plane orthogonal to the up-down direction is at a maximum at the end surfaces of the second inductor wires 71 at the first side. When viewed in the up-down direction, the largest area of the boundary portions 50 is greater than the area of the end surfaces of the second inductor wires 71 at the first side.

The first inductor wires 31 and the second inductor wires 71 are arranged in the up-down direction, that is, in the lamination direction, and the central axes of the first inductor wires 31 extending in the up-down direction coincide with the central axes of the second inductor wires 71 extending in the up-down direction. Therefore, when the inductor component 10 is viewed in the up-down direction, the first external terminals 32 and the second external terminals 72 overlap and are at the same positions. In addition, the dimension of the first inductor wires 31 in the up-down direction is equal to the dimension of the second inductor wires 71 in the up-down direction.

A method for manufacturing the inductor component 10 according to the first embodiment will now be described.

Figure 3:
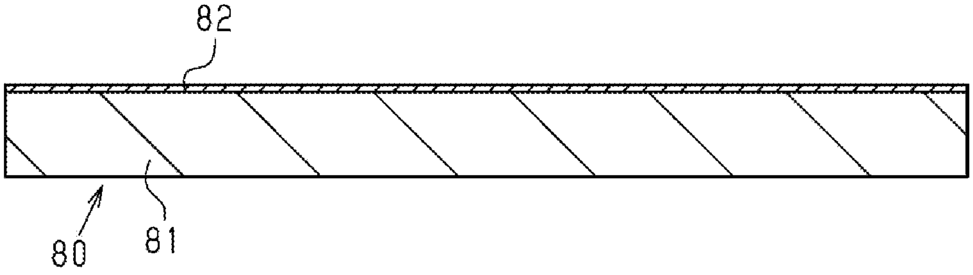
FIG. 3 illustrates a method for manufacturing the inductor component according to the first embodiment.

To manufacture the inductor component 10, first, a third-layer group including third layers L3 that are not separated from each other is formed. In the present embodiment, the third-layer group is formed by a semi-additive process. As illustrated in FIG. 3, first, a copper-foil-coated base substrate 80 is prepared. The copper-foil-coated base substrate 80 includes a third-layer base substrate 81 that is plate-shaped. A copper foil 82 is laminated on a surface of the third-layer base substrate 81 at the upper side in the lamination direction.

Figure 4:
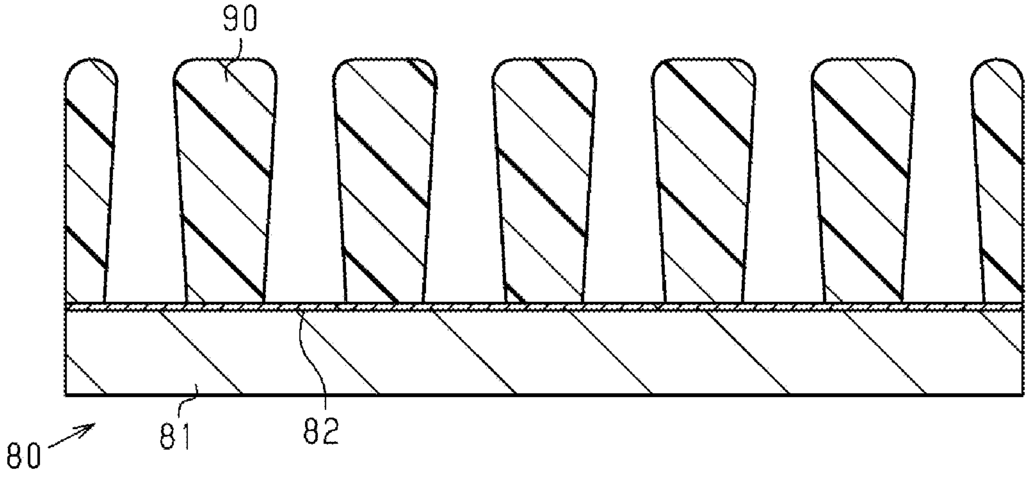
FIG. 4 illustrates the method for manufacturing the inductor component according to the first embodiment.

Next, a first resist layer 90 is formed. As illustrated in FIG. 4, the first resist layer 90 is patterned to cover the upper surface of the copper foil 82 of the copper-foil-coated base substrate 80 in regions where the second inductor wires 71 are not to be formed. More specifically, first, a photosensitive dry film resist is applied to the upper surface of the copper foil 82 over the entire area thereof. Next, the upper surface of the copper foil 82 is exposed to light in regions where the second inductor wires 71 are not to be formed. As a result, portions of the applied dry film resist that are exposed to light are cured. After that, uncured portions of the applied dry film resist are removed by using a chemical solution. Thus, the cured portions of the applied dry film resist remain as the first resist layer 90. In regions where the applied dry film resist is removed by the chemical solution, the copper foil 82 is not covered by the first resist layer 90 and is exposed. In the present embodiment, by adjusting the focal point during exposure and curing conditions, the first resist layer 90 is formed so that hollow spaces in which the second inductor wires 71 are to be formed are tapered such that the diameter thereof decreases toward the upper side. In other words, the first resist layer 90 is formed to include inversely tapered portions having a diameter that increases toward the upper side in a cross section taken along the up-down direction.

Figure 5:
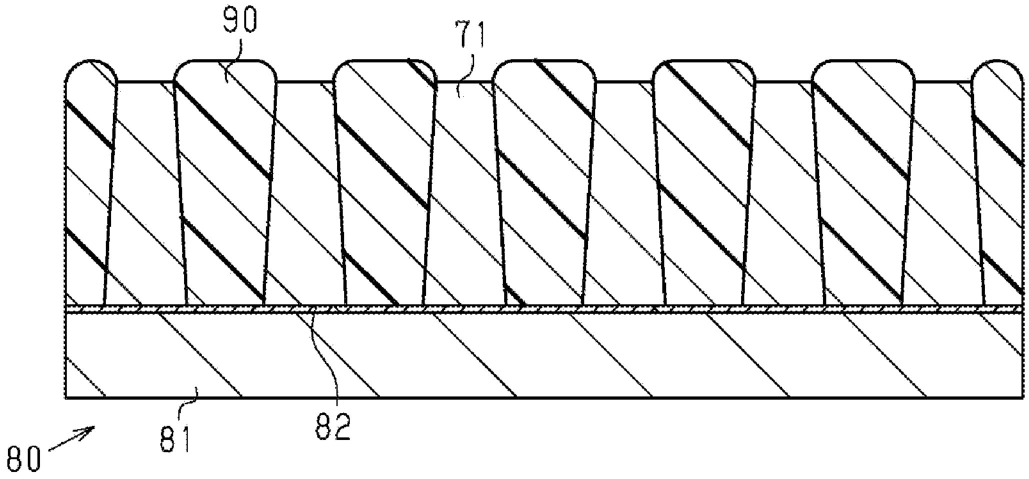
FIG. 5 illustrates the method for manufacturing the inductor component according to the first embodiment.

Next, the second inductor wires 71 are formed in a second-inductor-wire forming step. As illustrated in FIG. 5, the second inductor wires 71 are formed on the upper surface of the copper foil 82 of the copper-foil-coated base substrate 80 in the regions where the first resist layer 90 is not formed. Accordingly, the second inductor wires 71 are shaped to extend linearly in the lamination direction. More specifically, the upper surface of the copper foil 82 is immersed in an electrolytic copper plating solution to perform electrolytic copper plating so that the second inductor wires 71, which contain about 99 wt % or more of copper, are formed on the upper surface of the copper foil 82.

Figure 6:
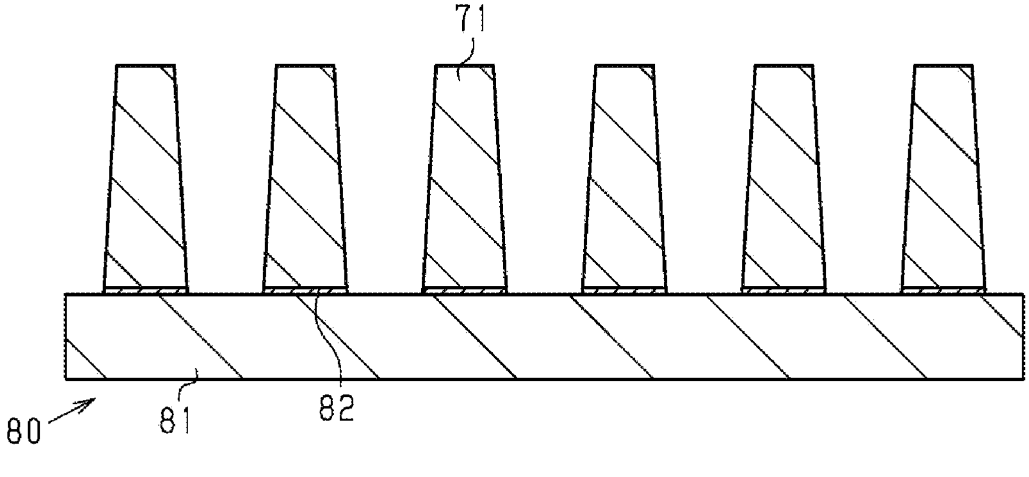
FIG. 6 illustrates the method for manufacturing the inductor component according to the first embodiment.

Next, the first resist layer 90 is removed. Referring to FIG. 6, a portion of the first resist layer 90 is physically retained, and the first resist layer 90 is pulled off and separated from the copper-foil-coated base substrate 80. In the present embodiment, the second inductor wires 71 are tapered such that the diameter thereof decreases toward the upper side.

Next, portions of the copper foil 82 that are not covered by the second inductor wires 71 are removed. More specifically, the copper foil 82 is etched so that portions of the copper foil 82 that are not covered by the second inductor wires 71 and exposed are removed.

Figure 7:
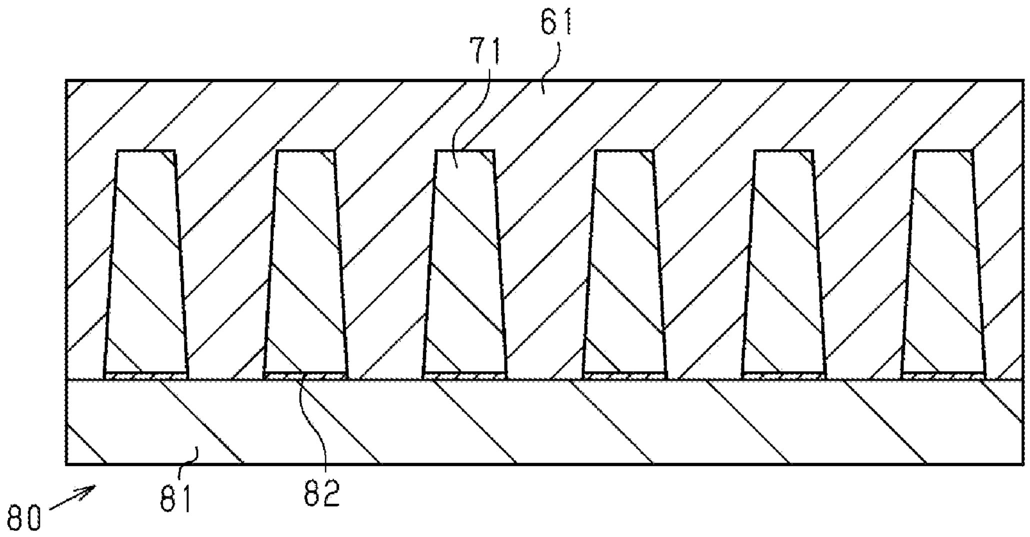
FIG. 7 illustrates the method for manufacturing the inductor component according to the first embodiment.

Next, in a second-magnetic-layer forming step, a resin containing magnetic powder, which is the material of the second magnetic layer 61, is applied. As illustrated in FIG. 7, the resin containing magnetic powder is applied so that the upper surfaces of the second inductor wires 71 are covered. Next, the resin containing magnetic powder is pressed and compacted to form the second magnetic layer 61.

Figure 8:
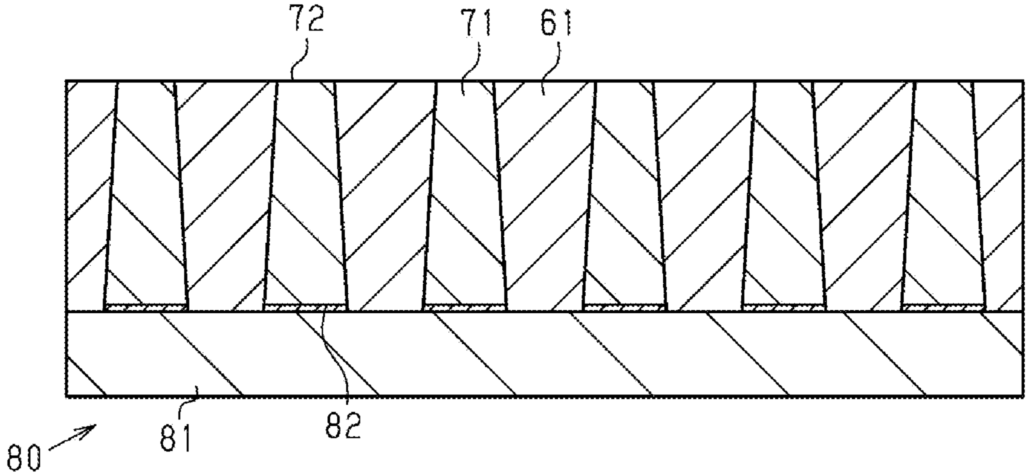
FIG. 8 illustrates the method for manufacturing the inductor component according to the first embodiment.

Next, in a second-external-terminal forming step, an upper portion of the second magnetic layer 61 is cut off. As illustrated in FIG. 8, the upper portion of the second magnetic layer 61 is cut off so that the upper end surfaces of the second inductor wires 71, which are the second external terminals 72, are exposed. Thus, in the second-external-terminal forming step, the second external terminals 72 that are exposed only at the second terminal surface F2 are formed. In addition, the second magnetic layer 61 is formed in the regions around the second inductor wires 71 so that the second inductor wires 71 extend linearly through the second magnetic layer 61.

Figure 9:
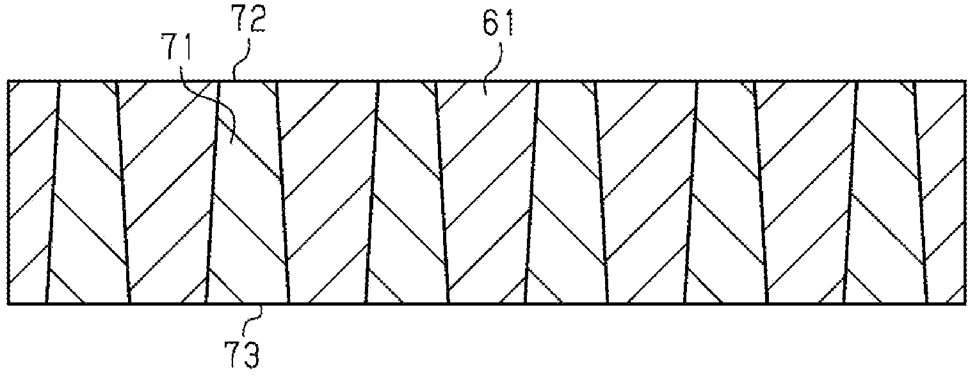
FIG. 9 illustrates the method for manufacturing the inductor component according to the first embodiment.

Next, in a second-internal-terminal forming step, the copper-foil-coated base substrate 80 is removed. As illustrated in FIG. 9, the copper-foil-coated base substrate 80 is cut off so that the lower end surfaces of the second inductor wires 71, which are the second internal terminals 73, are exposed. In the present embodiment, the copper foil 82 is also entirely cut off so that the lower end surfaces of the second inductor wires 71 in the second magnetic layer 61 are exposed. Thus, in the second-internal-terminal forming step, the second internal terminals 73 that are exposed only at the surface of each third layer L3 at the side opposite to the second terminal surface F2 are formed. The second inductor wires 71 extend through the second magnetic layer 61.

The third-layer group including the third layers L3 is formed by the second-inductor-wire forming step, the second-magnetic-layer forming step, the second-external-terminal forming step, and the second-internal-terminal forming step.

Figure 10:
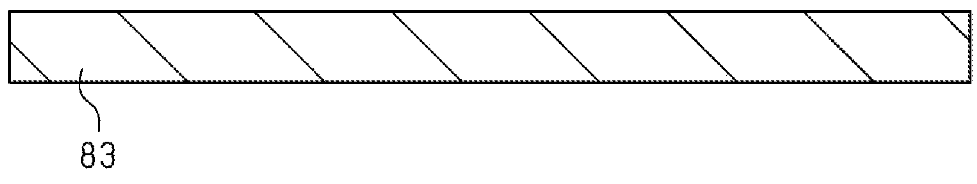
FIG. 10 illustrates the method for manufacturing the inductor component according to the first embodiment.

In addition to the above-described third-layer group, a first-layer group including first layers L1 that are not separated from each other is also formed. As illustrated in FIG. 10, first, a first-layer base substrate 83 is prepared. The first-layer base substrate 83 is plate-shaped.

Figure 11:
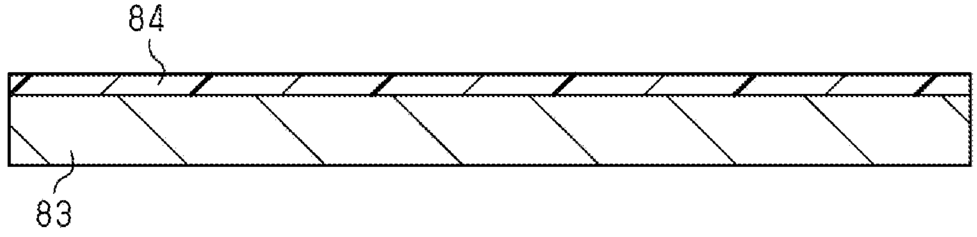
FIG. 11 illustrates the method for manufacturing the inductor component according to the first embodiment.

Next, an adhesive layer 84 is attached to the upper surface of the first-layer base substrate 83. Referring to FIG. 11, in the present embodiment, the adhesive layer 84 is an adhesive sheet that can be removed from the first-layer base substrate 83 after being attached thereto. The adhesive layer 84 also has an adhesive surface at a side opposite to the side adjacent to the first-layer base substrate 83. Thus, the adhesive layer 84 has adhesive surfaces on both sides thereof.

Figure 12:
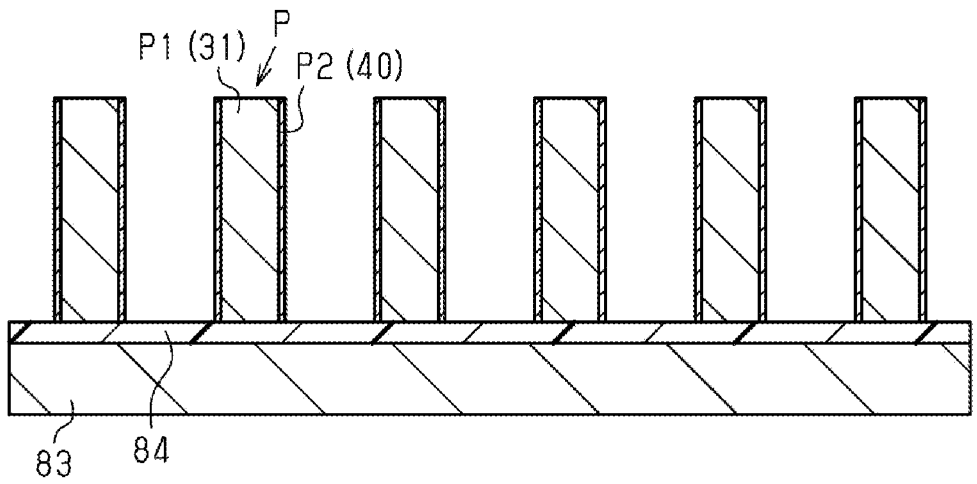
FIG. 12 illustrates the method for manufacturing the inductor component according to the first embodiment.

Next, in a first-inductor-wire forming step, columnar metal members P are attached to the upper surface of the adhesive layer 84. As illustrated in FIG. 12, the columnar metal members P are substantially cylindrical and extend linearly. Each columnar metal member P includes a metal portion P1 and an insulating portion P2. The metal portions P1 are substantially cylindrical. The metal portions P1 are made of copper. The insulating portions P2 entirely cover side surfaces of the metal portions P1, the side surfaces being orthogonal to the surfaces of the metal portions P1 that are bonded to the adhesive layer 84. The insulating portions P2 have a substantially uniform thickness. The insulating portions P2 are made of epoxy resin. As described below, in the present embodiment, the metal portions P1 serve as the first inductor wires 31 and the insulating portions P2 serve as the insulating films 40.

Figure 13:
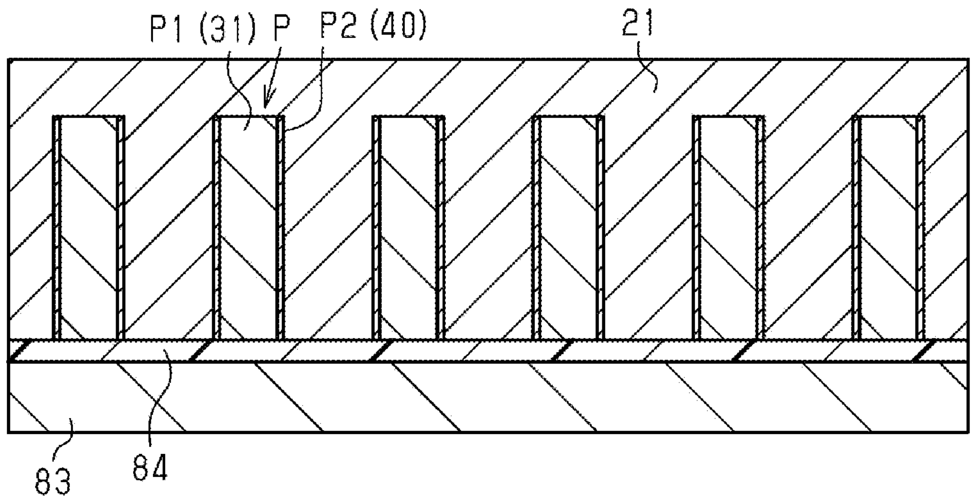
FIG. 13 illustrates the method for manufacturing the inductor component according to the first embodiment.

Next, in a first-magnetic-layer forming step, a resin containing magnetic powder, which is the material of the first magnetic layer 21, is applied. As illustrated in FIG. 13, the resin containing magnetic powder is applied so that the upper end surfaces of the columnar metal members P are covered. Next, the resin containing magnetic powder is pressed and compacted to form the first magnetic layer 21.

Figure 14:
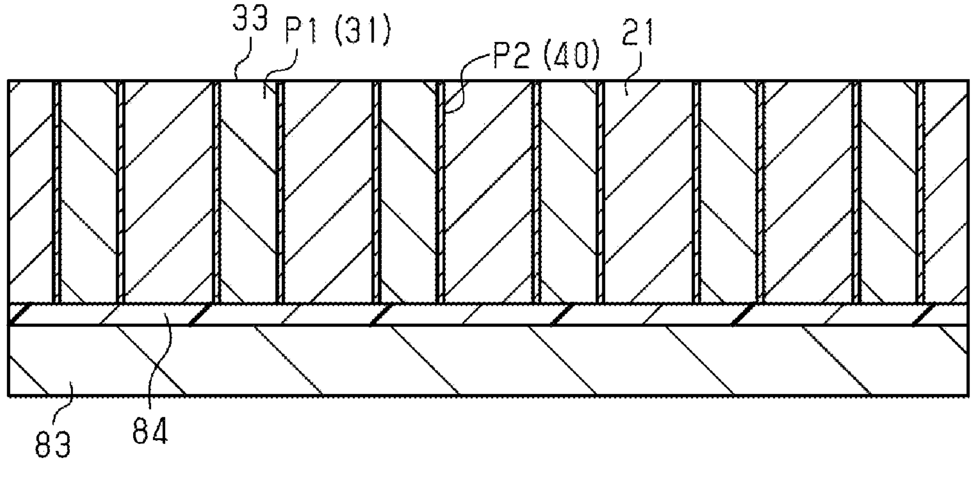
FIG. 14 illustrates the method for manufacturing the inductor component according to the first embodiment.

Next, in a first-internal-terminal forming step, an upper portion of the first magnetic layer 21 is cut off. As illustrated in FIG. 14, the upper portion of the first magnetic layer 21 is cut off so that the upper end surfaces of the columnar metal members P are exposed. When the upper end surfaces of the columnar metal members P are exposed, the first internal terminals 33 of the first inductor wires 31 are formed. Thus, in the first-internal-terminal forming step, the first internal terminals 33 that are exposed only at a surface of the first layer L1 at a side opposite to the first terminal surface F1 are formed.

Figure 15:
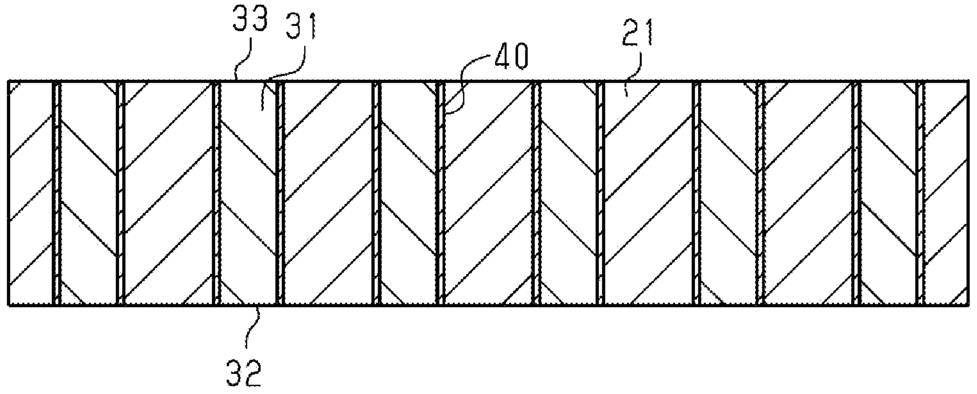
FIG. 15 illustrates the method for manufacturing the inductor component according to the first embodiment.

Next, in a first-external-terminal forming step, the first-layer base substrate 83 and the adhesive layer 84 are removed. Referring to FIG. 15, the adhesive layer 84 and the first-layer base substrate 83 are physically retained and pulled off so that the upper surface of the adhesive layer 84 is separated from the lower surface of the first magnetic layer 21. As a result, the lower surfaces of the columnar metal members P are exposed at the lower surface of the first magnetic layer 21, and the first external terminals 32 of the first inductor wires 31 are formed accordingly. Thus, in the first-external-terminal forming step, the first external terminals 32 that are exposed only at the first terminal surface F1 are formed. The first inductor wires 31 extend linearly through the first magnetic layer 21. Therefore, the metal portions P1 serve as the first inductor wires 31, and the insulating portions P2, which cover the metal portions P1, serve as the insulating films 40. Thus, a first-layer group including the first layers L1 that are not separated from each other is formed.

Figure 16:
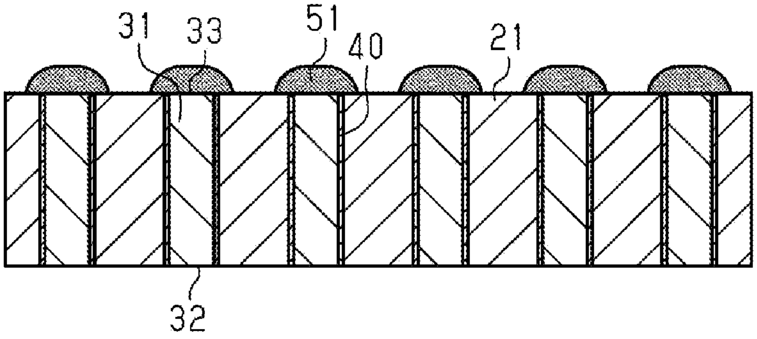
FIG. 16 illustrates the method for manufacturing the inductor component according to the first embodiment.
Figure 17:
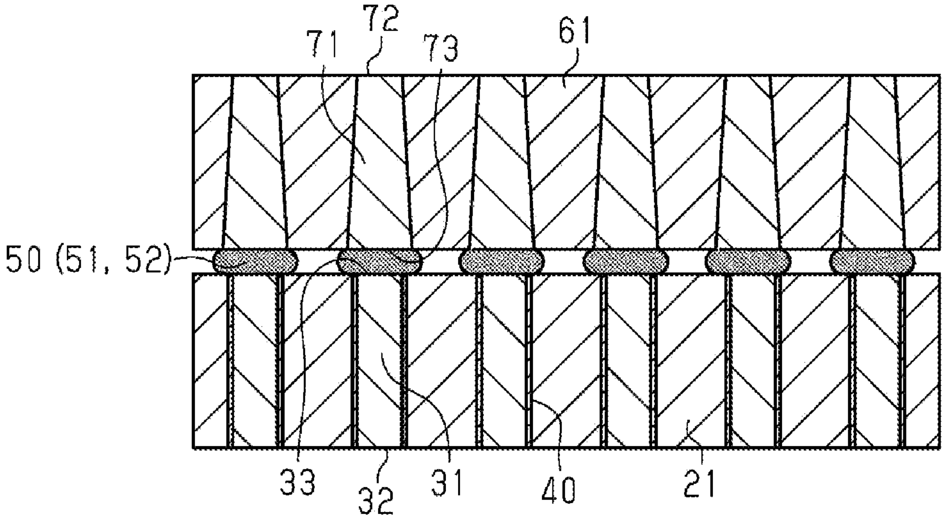
FIG. 17 illustrates the method for manufacturing the inductor component according to the first embodiment.

Next, in a boundary-portion forming step, the first-layer group and the second-layer group described above are connected to each other. As illustrated in FIG. 16, first, solder portions 51 in a heated state are placed on the upper surfaces of the first internal terminals 33 of the first-layer group. Next, as illustrated in FIG. 17, the third-layer group is laminated onto the solder portions 51 so that the second internal terminals 73 of the third-layer group are placed on the upper surfaces of the solder portions 51. Then, the solder portions 51 are cooled. As a result, the intermetallic compound portion 52 is formed between each solder portion 51 and a corresponding one of the first internal terminals 33. Similarly, the intermetallic compound portion 52 is also formed between each solder portion 51 and a corresponding one of the second internal terminals 73. Thus, the boundary portions 50 are formed, the boundary portions 50 connecting the first internal terminals 33 provided at the second ends of the first inductor wires 31 to the second internal terminals 73 provided at the first ends of the second inductor wires 71 and serving as physical boundaries between the first inductor wires 31 and the second inductor wires 71.

Figure 18:
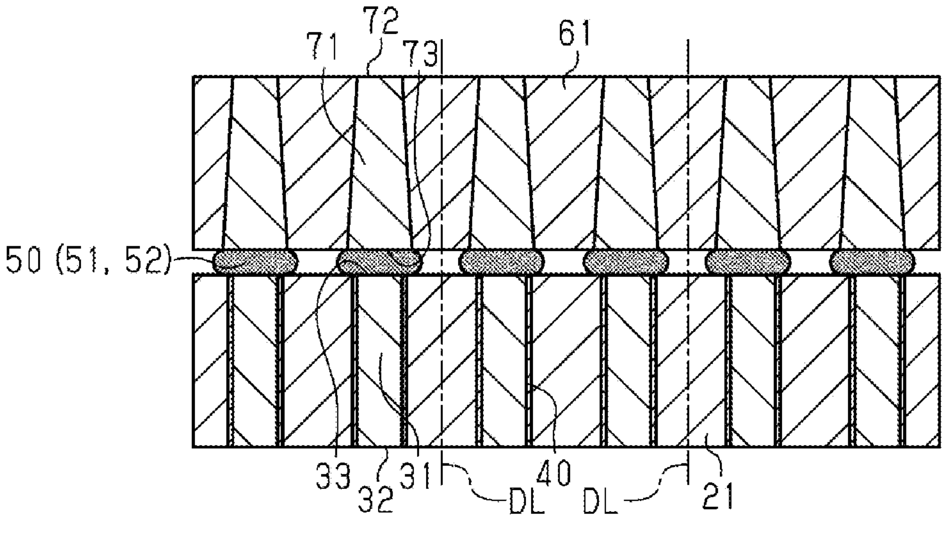
FIG. 18 illustrates the method for manufacturing the inductor component according to the first embodiment.

Next, as illustrated in FIG. 18, the first-layer group and the third-layer group that are integrated together are cut along dicing lines DL that pass through the first magnetic layer 21 and the second magnetic layer 61, and are thereby diced into pieces. Thus, the inductor component 10 is obtained.

Operations and effects of the above-described first embodiment will now be described.

(1-1) In the inductor component 10 according to the first embodiment, the first inductor wires 31 are connected to the second inductor wires 71 by the boundary portions 50. The first external terminals 32 are exposed only at the first terminal surface F1, which is at the first side of the body 11 in the lamination direction, and the second external terminals 72 are exposed only at the second terminal surface F2, which is at the second side of the body 11 in the lamination direction. Therefore, the inductor component 10 can be mounted on a substrate in a smaller mounting area than when two inductor wires composed of different components are arranged next to each other on the same surface of the substrate.

(1-2) The inductor component 10 according to the first embodiment is configured such that the first inductor wires 31 and the second inductor wires 71 are arranged in the up-down direction, that is, in the lamination direction. Therefore, overall, the wires extend to conduct current in the up-down direction in the inductor component 10, so that the volume of the magnetic material in the body 11 can be more easily increased than when the wires are excessively bent and when the first inductor wires 31 and the second inductor wires 71 are not aligned.

(1-3) The inductor component 10 according to the first embodiment is configured such that the first inductor wires 31 and the second inductor wires 71 overlap when viewed in the up-down direction. Therefore, the inductor component 10 can be mounted on a substrate in a smaller mounting area than when two inductor wires composed of different components are arranged next to each other on the same mounting surface of the substrate.

(1-4) The inductor component 10 according to the first embodiment is configured such that the first external terminals 32 and the second external terminals 72 overlap when viewed in the up-down direction. Therefore, the area required to mount the inductor component 10 at the first terminal surface F1 or the second terminal surface F2 can be reduced to the area of the first external terminals 32 at a minimum.

(1-5) The inductor component 10 according to the first embodiment is configured such that the material of the first inductor wires 31 and the second inductor wires 71 contains copper as the largest constituent thereof. Therefore, the material cost of the first inductor wires 31 and the second inductor wires 71 can be relatively easily reduced. In addition, the material of the boundary portions 50 differs from the material of the first inductor wires 31 and the second inductor wires 71. Therefore, breakage of the inductor component 10, for example, due to the inductor component 10 being subjected to similar conditions during manufacture can be prevented.

(1-6) The inductor component 10 according to the first embodiment is configured such that each boundary portion 50 includes the intermetallic compound portion 52 that adjoins the corresponding one of the first inductor wires 31. Therefore, the boundary portions 50 can be reliably arranged to be in close contact with the first inductor wires 31. This also applies to the relationship between the boundary portions 50 and the second inductor wires 71.

(1-7) The inductor component 10 according to the first embodiment is configured such that the material of the boundary portions 50 contains about 50 wt % or more and about 99 wt % or less (i.e., from about 50 wt % to about 99 wt %) of tin. Therefore, when the solder portion 51 of each boundary portion 50 is connected to the corresponding one of the first internal terminals 33, an alloy containing tin and copper is formed as the intermetallic compound portion 52. Thus, when the boundary portions 50 are made of the above-described material, the intermetallic compound portion 52 can be easily formed.

(1-8) The inductor component 10 according to the first embodiment is configured such that the thickness of the boundary portions 50 is equal to the distance between the first internal terminals 33 and the second internal terminals 73. The thickness of the boundary portions 50 is greater than or equal to about one-tenth of the diameter of the first internal terminals 33 having a substantially circular shape when viewed in a direction orthogonal to the first terminal surface F1. Thus, the thickness of the boundary portions 50 is appropriately large relative to the exposed area of the first internal terminals 33, so that sufficient connection strength can be obtained. In addition, the thickness of the boundary portions 50 is less than or equal to about one-third of the dimension of the second inductor wires 71 in the up-down direction. Thus, the thickness of the boundary portions 50 is appropriately small Therefore, the size of the boundary portions 50 is also appropriately small when viewed in the up-down direction. Accordingly, interference between the boundary portions 50 that are adjacent to each other can be prevented.

(1-9) The inductor component 10 according to the first embodiment is configured such that among the first inductor wires 31, the second inductor wires 71, and the boundary portions 50, the boundary portions 50 have the largest cross-sectional area along a plane parallel to the first terminal surface F1. In other words, when viewed in the up-down direction, the maximum area of the boundary portions 50 is greater than the maximum cross-sectional areas of the first inductor wires 31 and the second inductor wires 71 along planes orthogonal to the up-down direction. Therefore, an increase in the direct-current resistance of the inductor component 10 due to the boundary portions 50 can be suppressed.

(1-10) The inductor component 10 according to the first embodiment is configured such that the first inductor wires 31 are substantially columnar and extend in the direction orthogonal to the first terminal surface F1. In addition, the second inductor wires 71 are substantially columnar and extend in the direction orthogonal to the second terminal surface F2. The central axes of the first inductor wires 31 coincide with the central axes of the second inductor wires 71. Therefore, when viewed in the direction orthogonal to the first terminal surface F1, the first inductor wires 31 and the second inductor wires 71 substantially completely overlap.

(1-11) The inductor component 10 according to the first embodiment is configured such that the cross-sectional area of the second inductor wires 71 along a plane orthogonal to the direction in which the second inductor wires 71 extend decreases toward the second terminal surface F2. Therefore, the size of the second internal terminals 73 of the second inductor wires 71 may be increased to increase the connection area between the second inductor wires 71 and the boundary portions 50, so that the second inductor wires 71 can be strongly connected to the first inductor wires 31 and the boundary portions 50. In addition, the size of the second external terminals 72 may be reduced to reduce the mounting area on the substrate. Furthermore, during manufacture, the first resist layer 90 can be prevented from being caught by the second inductor wires 71 when the first resist layer 90 is removed.

(1-12) According to the above-described method for manufacturing the inductor component 10 of the first embodiment, the first inductor wires 31 are connected to the second inductor wires 71 by the boundary portions 50 in the boundary-portion forming step. Therefore, the manufactured inductor component 10 is configured such that the first external terminals 32 are exposed only at the first terminal surface F1, which is located at the first side of the body 11 in the lamination direction, and that the second external terminals 72 are exposed only at the second terminal surface F2, which is located at the second side of the body 11 in the lamination direction. Thus, the inductor component 10 can be manufactured so that the mounting area thereof on a substrate is smaller than when two inductor wires composed of different components are arranged next to each other on the same mounting surface of the substrate.

Second Embodiment

An inductor component and a method for manufacturing the inductor component according to a second embodiment will now be described.

An inductor component 110 according to the second embodiment differs from the first embodiment mainly in the boundary portions and the manufacturing method. In the following description, structures similar to those of the first embodiment are denoted by the same reference signs, and description thereof is omitted or simplified.

Figure 19:
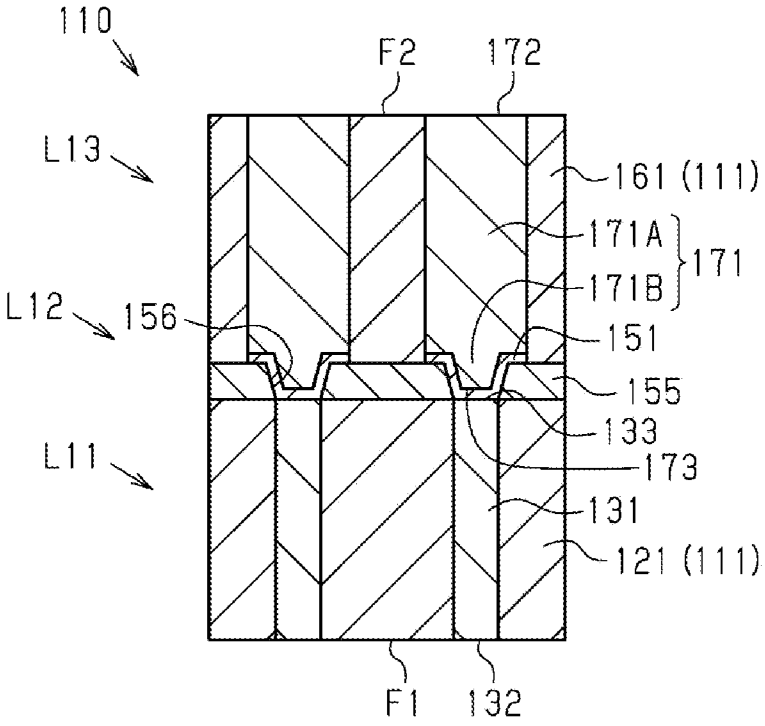
FIG. 19 is a sectional view of an inductor component according to a second embodiment.

Referring to FIG. 19, the inductor component 110 has a structure including three layers laminated in a thickness direction. In the following description, a lamination direction in which the three layers are laminated is referred to as an up-down direction.

A first layer L11 includes a first magnetic layer 121 and first inductor wires 131. Unlike the first layer L1 of the first embodiment, the first layer L11 of the second embodiment includes no insulating films 40.

In the first layer L11, end surfaces of the first inductor wires 131 at a lower side, which is a first side in the up-down direction, function as first external terminals 132. In addition, end surfaces of the first inductor wires 131 at an upper side, which is a second side in the up-down direction, function as first internal terminals 133.

A second layer L12 is laminated on the upper surface of the first layer L11. In the second embodiment, the second layer L12 includes a seed layer 151, portions of second inductor wires 171, and an insulating layer 155. The thickness of the second layer L12 is less than the thickness of the first layer L11.

The insulating layer 155, which is made of a resin, is laminated on the upper surface of the first layer L11. The insulating layer 155 has a plurality of holes 156 extending therethrough in the up-down direction. The holes 156 are disposed above the first internal terminals 133 of the first inductor wires 131. Accordingly, the first internal terminals 133 are exposed at the bottom of the holes 156.

The seed layer 151, which serves as boundary portions, covers the first internal terminals 133 of the first inductor wires 131, the inner peripheral surfaces of the holes 156 in the insulating layer 155, and portions of the upper surface of the insulating layer 155 around the edges of the holes 156. The seed layer 151 is made of copper. The thickness of the seed layer 151 is greater than or equal to about 1 nm and less than or equal to about 10 μm (i.e., from about 1 nm to about 10 μm). In this embodiment, the thickness of the seed layer 151 is about 1 μm. In FIG. 19, the thickness of the seed layer 151 is exaggerated.

The second inductor wires 171 are connected to the upper surface of the seed layer 151. The second inductor wires 171 are substantially columnar overall and extend in the up-down direction. The second inductor wires 171 include upper portions 171A that are disposed above the holes 156, and lower portions 171B that are disposed in the holes 156 and that have a diameter less than that of the upper portions 171A. In the second embodiment, the upper portions 171A have a diameter greater than that of the first inductor wires 131 when viewed in the up-down direction.

In this embodiment, the lower portions 171B of the second inductor wires 171 constitute portions of the second layer L12. In addition, in the second embodiment, surfaces of the second inductor wires 171 that are in contact with the seed layer 151 serve as second internal terminals 173.

A third layer L13 is laminated on the upper surface of the second layer L12. In the second embodiment, the third layer L13 includes the upper portions 171A of the second inductor wires 171 and a second magnetic layer 161. The thickness of the third layer L13 is equal to the thickness of the first layer L11. End surfaces of the upper portions 171A of the second inductor wires 171 at the upper side, which is the second side in the up-down direction, function as second external terminals 172. In this embodiment, the second magnetic layer 161 of the third layer L13 and the first magnetic layer 121 of the above-described first layer L11 constitute a body 111 of the inductor component 110.

The central axes of the first inductor wires 131 extending in the up-down direction coincide with the central axes of the second inductor wires 171 extending in the up-down direction. Therefore, when the inductor component 110 is viewed in the up-down direction, the first external terminals 132 are disposed within the second external terminals 172.

A method for manufacturing the inductor component 110 according to the second embodiment will now be described.

To manufacture the inductor component 110, first, a first-layer group including first layers L11 that are not separated from each other is formed. The first-layer group is formed by a process similar to that for forming the third-layer group in the first embodiment, that is, by a semi-additive process. Although not described in detail, the first-layer group is formed by forming a first resist layer 90 on an upper surface of a copper-foil-coated base substrate 80 and then forming the first inductor wires 131 in a first-inductor-wire forming step. Unlike the third-layer group of the first embodiment, when the first-layer group of the second embodiment is formed, the first resist layer 90 is formed by adjusting the focal point during exposure and curing conditions so that the first inductor wires 131 are formed in a substantially cylindrical shape.

Figure 20:
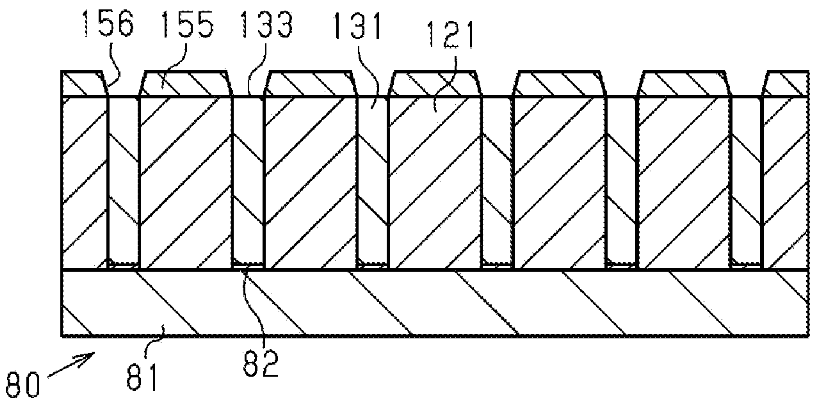
FIG. 20 illustrates a method for manufacturing the inductor component according to the second embodiment.

Next, in a boundary-portion forming step, the insulating layer 155 and the seed layer 151 that constitute portions of the second layer are formed on the upper surface of the first-layer group. Referring to FIG. 20, an insulating resin is applied to the upper surface of the first layer over the entire area thereof. Next, the insulating resin is cured to form the insulating layer 155. Next, the holes 156 are formed in the insulating layer 155 by laser processing at positions above the first internal terminals 133 of the first inductor wires 131. Thus, the first internal terminals 133 are exposed.

Figure 21:
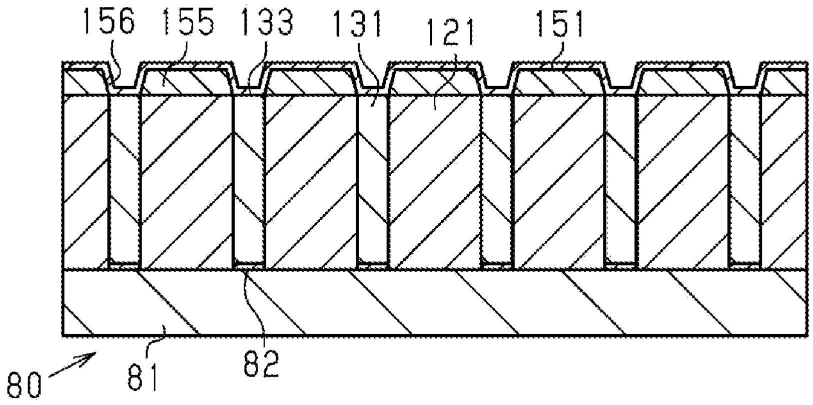
FIG. 21 illustrates the method for manufacturing the inductor component according to the second embodiment.

Next, as illustrated in FIG. 21, the seed layer 151 is formed on the upper surface of the first-layer group over the entire area thereof by sputtering. More specifically, the seed layer 151 is laminated on the upper surface of the insulating layer 155, the inner peripheral surfaces of the holes 156, and the first internal terminals 133.

Figure 22:
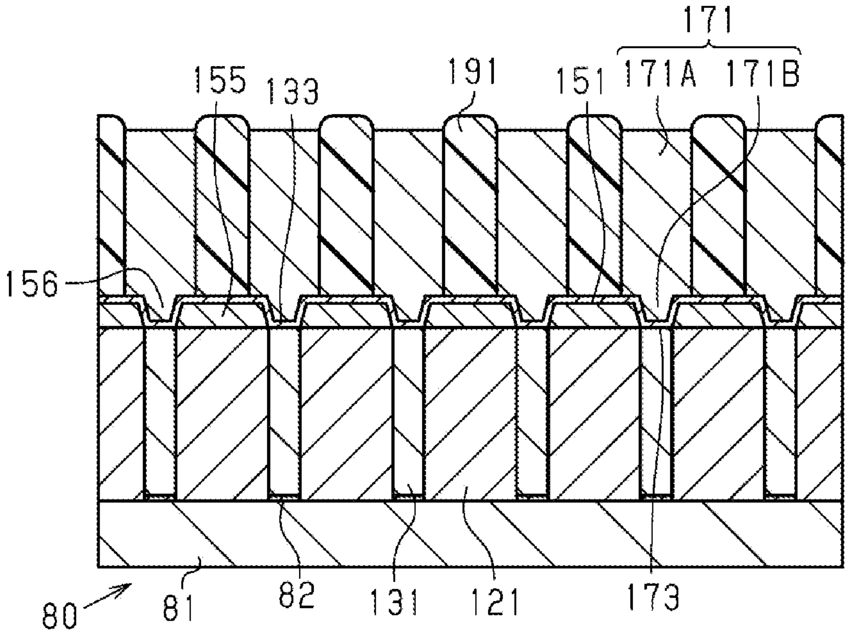
FIG. 22 illustrates the method for manufacturing the inductor component according to the second embodiment.

Next, the second inductor wires 171, which constitute portions of the second layer L12 and the third layer L13, are formed on the upper surface of the seed layer 151. First, a second resist layer 191 is formed. As illustrated in FIG. 22, the second resist layer 191 is patterned to cover the upper surface of the seed layer 151 in regions where the second inductor wires 171 are not to be formed.

Next, the second inductor wires 171 are formed. The second inductor wires 171 are formed on the upper surface of the seed layer 151 in regions where the second resist layer 191 is not formed. More specifically, the upper surface of the seed layer 151 is immersed in an electrolytic copper plating solution to perform electrolytic copper plating so that the second inductor wires 171, which contain about 99 wt % or more of copper, are formed on the upper surface of the seed layer 151. As a result, the seed layer 151 serves as the boundary portions between the second inductor wires 171 and the first inductor wires 131.

Next, the second resist layer 191 is removed. Although not illustrated, a portion of the second resist layer 191 is physically retained, and the second resist layer 191 is pulled off and separated from the first-layer group. In the present embodiment, the upper portions 171A of the second inductor wires 171 are substantially cylindrical.

Next, portions of the seed layer 151 that are not covered by the second inductor wires 171 are removed. More specifically, the seed layer 151 is etched so that portions of the seed layer 151 that are not covered by the second inductor wires 171 and exposed are removed.

Next, a resin containing magnetic powder, which is the material of the second magnetic layer 161, is applied. The resin containing magnetic powder is applied so that the upper end surfaces of the second inductor wires 171 are covered. Next, the resin containing magnetic powder is pressed and compacted to form the second magnetic layer 161.

Figure 23:
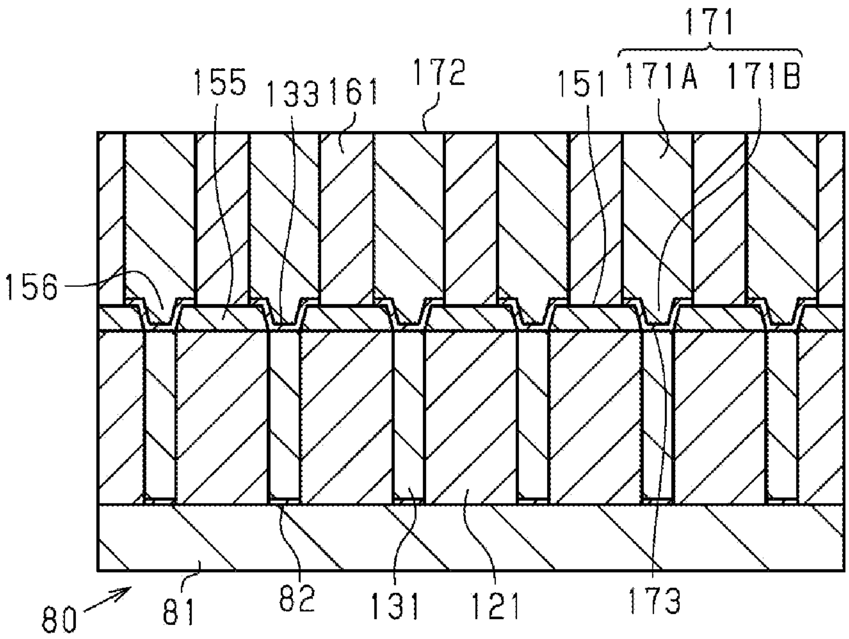
FIG. 23 illustrates the method for manufacturing the inductor component according to the second embodiment.

Next, an upper portion of the second magnetic layer 161 is cut off. As illustrated in FIG. 23, the upper portion of the second magnetic layer 161 is cut off so that the upper end surfaces of the second inductor wires 171, which are the second external terminals 172, are exposed. Thus, the upper portions 171A of the second inductor wires 171 and the second magnetic layer 161, which constitute the third layer L13, are formed.

Figure 24:
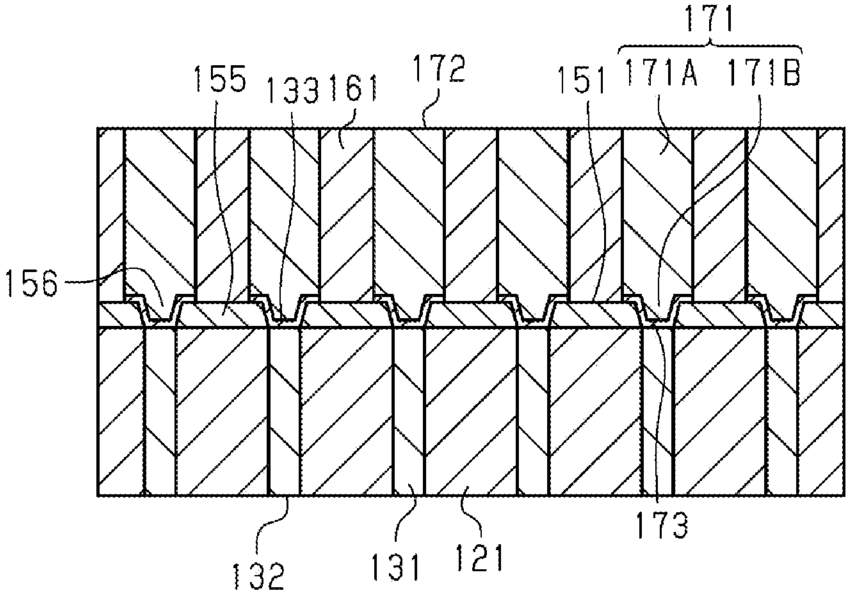
FIG. 24 illustrates the method for manufacturing the inductor component according to the second embodiment.

Next, the copper-foil-coated base substrate is removed. As illustrated in FIG. 24, the copper-foil-coated base substrate 80 is cut off so that the lower end surfaces of the first inductor wires 131, which are the first external terminals 132, are exposed. Next, although not illustrated, dicing is performed to obtain the inductor component 110.

Operations and effects of the above-described second embodiment will now be described. The second embodiment provides the following effects in addition to the effects described above in (1-1) to (1-5), (1-9), (1-10), and (1-12).

(2-1) According to the above-described second embodiment, the seed layer 151, which functions as the boundary portions, and the first internal terminals 133 are made of the same material, which is copper. Therefore, the connection strength between the seed layer 151 and the first internal terminals 133 can be increased.

(2-2) According to the above-described second embodiment, the thickness of the seed layer 151, which functions as the boundary portions, is greater than or equal to about 1 nm. Therefore, the surfaces of the first internal terminals 133 can be reliably covered by the seed layer 151. In addition, the thickness of the seed layer 151, which functions as the boundary portions, is less than or equal to about 10 μm. Therefore, the influence of sputtering on the insulating layer 155 during manufacture can be reduced.

(2-3) According to the above-described second embodiment, the diameter of the first inductor wires 131 is less than that of the upper portions 171A of the second inductor wires 171 when viewed in the up-down direction. For example, the overall inductance of the inductor component 110 can be adjusted by changing the diameter of the first inductor wires 131 or the diameter of the upper portions 171A of the second inductor wires 171 when viewed in the up-down direction.

Third Embodiment

An inductor component and a method for manufacturing the inductor component according to a third embodiment will now be described.

An inductor component 210 according to the third embodiment differs from the first and second embodiments in the structure of internal terminals of first inductor wires 231 and the position of boundary portions. In the following description, structures similar to those of the first embodiment or the second embodiment are denoted by the same reference signs, and description thereof is omitted or simplified.

Figure 25:
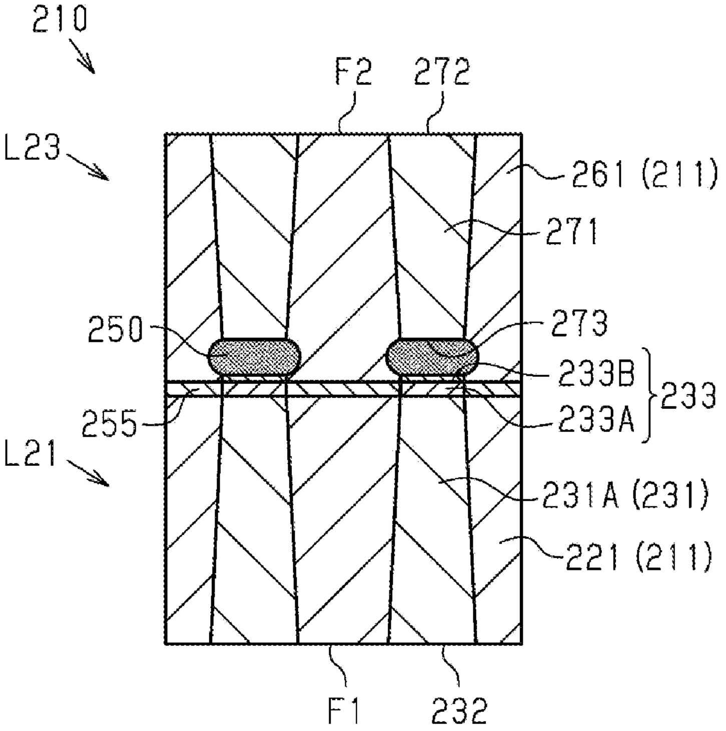
FIG. 25 is a sectional view of an inductor component according to a third embodiment.

As illustrated in FIG. 25, the inductor component 210 is configured such that each of the first inductor wires 231 includes a wire body 231A, a first external terminal 232, and a first internal terminal 233. The wire bodies 231A are substantially cylindrical and extend in the up-down direction. End surfaces of the wire bodies 231A at a lower side, which is a first side in the direction in which the wire bodies 231A extend, are exposed at a first terminal surface F1, which is a lower surface of a first magnetic layer 221. In the third embodiment, the lower end surfaces of the wire bodies 231A serve as the first external terminals 232.

End surfaces of the wire bodies 231A at an upper side, which is a second side in the direction in which the wire bodies 231A extend, are flush with the upper surface of the first magnetic layer 221. The first internal terminals 233 are connected to the upper end surfaces of the wire bodies 231A. The first internal terminals 233 have a two-layer structure including an anti-corrosion layer 233A made of nickel and a solder-receiving layer 233B made of gold arranged in that order from a side adjacent to the wire bodies 231A. Thus, in the third embodiment, the first internal terminals 233 project from the upper surface of the first magnetic layer 221.

An insulating layer 255 is laminated on the upper surface of the first magnetic layer 221 over the entire area thereof. The thickness of the insulating layer 255 is slightly less than that of the first internal terminals 233. In the third embodiment, a first layer L21 includes the first inductor wires 231, the first magnetic layer 221, and the insulating layer 255.

Boundary portions 250 are connected to the first internal terminals 233 at the upper side of the first internal terminals 233. Similarly to the first embodiment, the boundary portions 250 each include a solder portion 251 and two intermetallic compound portions. In the third embodiment, first intermetallic compound portions are provided above the solder-receiving layer 233B of the first internal terminals 233. The first intermetallic compound portions are composed of an alloy of tin and gold. Although the boundary portions 250 and the first internal terminals 233 are distinguishable from each other in FIG. 25, the boundary portions 250 and the first internal terminals 233 may be integrated such that interfaces and boundaries therebetween are not clear. Gold plating of the solder-receiving layer 233B is dispersed into the boundary portions 250. The amount of gold dispersed into the boundary portions 250 is preferably about 1.5 wt % or less. In such a case, the solder portions have a sufficient mechanical strength.

Second internal terminals 273 of second inductor wires 271 are connected to the boundary portions 250 at the upper side of the boundary portions 250. Second intermetallic compound portions are formed between the second internal terminals 273 and the solder portions 251. The second intermetallic compound portions are composed of an alloy of tin and copper. The intermetallic compound portions have a thickness that is significantly less than that of the solder portions 251, and are therefore not illustrated.

The second inductor wires 271 are substantially columnar and extend in the up-down direction. The dimension of the second inductor wires 271 in the up-down direction is less than the dimension of the first inductor wires 231 in the up-down direction. End surfaces of the second inductor wires 271 at the upper side, which is a second side in the direction in which the second inductor wires 271 extend, serve as second external terminals 272. A second magnetic layer 261 is laminated on the upper surface of the insulating layer 255 over the entire area thereof. The second magnetic layer 261 covers side surfaces of portions of the first internal terminals 233 that project from the upper surface of the insulating layer 255, the side surfaces extending orthogonally to the first terminal surface F1. The second magnetic layer 261 also covers portions of the outer surfaces of the boundary portions 250 other than the portions in contact with the first internal terminals 233 and the portions in contact with the second internal terminals 273. The second magnetic layer 261 also covers side surfaces of the second inductor wires 271. In the third embodiment, a third layer L23 includes the second inductor wires 271, the second magnetic layer 261, and the boundary portions 250. Thus, the inductor component 210 is formed by laminating the first layer L21 and the third layer L23 together. The inductor component 210 is configured such that the boundary portions 250 are included in the third layer L23. The thickness of the boundary portions 250 is less than or equal to about one-third of the longitudinal dimension of the second inductor wires 271. In this embodiment, the second magnetic layer 261 of the third layer L23 and the first magnetic layer 221 of the above-described first layer L21 constitute a body 211 of the inductor component 210.

A method for manufacturing the inductor component 210 according to the third embodiment will now be described.

Figure 26:
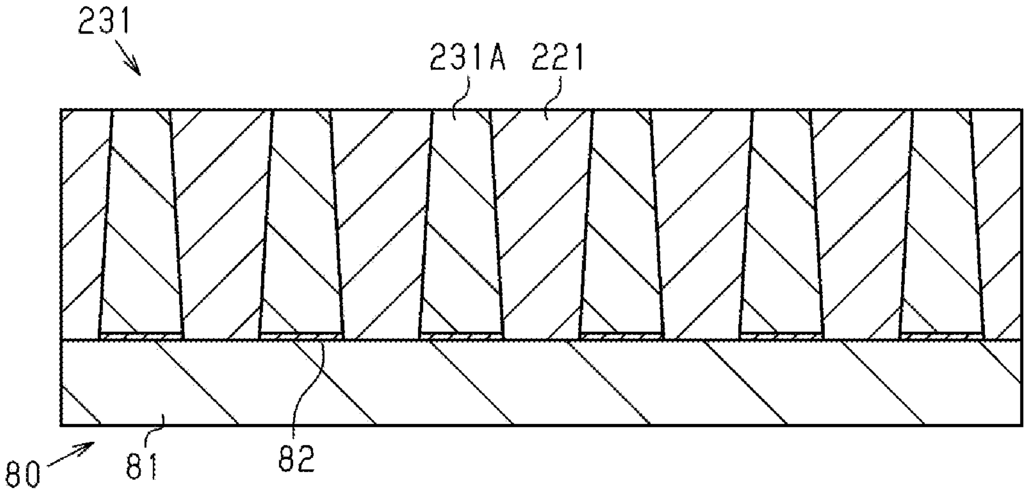
FIG. 26 illustrates a method for manufacturing the inductor component according to the third embodiment.

To manufacture the inductor component 210, first, a first-layer group including first layers L21 that are not separated from each other is formed. Although not illustrated, the first-layer group is formed by a process similar to that for forming the third-layer group in the first embodiment, that is, by a semi-additive process. More specifically, a first resist layer 90 is formed on an upper surface of a copper-foil-coated base substrate 80, and the wire bodies 231A of the first inductor wires 231 are formed. Then, as illustrated in FIG. 26, the first magnetic layer 221 is formed, and an upper portion of the first magnetic layer 221 is cut off so that the upper end surfaces of the wire bodies 231A are exposed.

Figure 27:
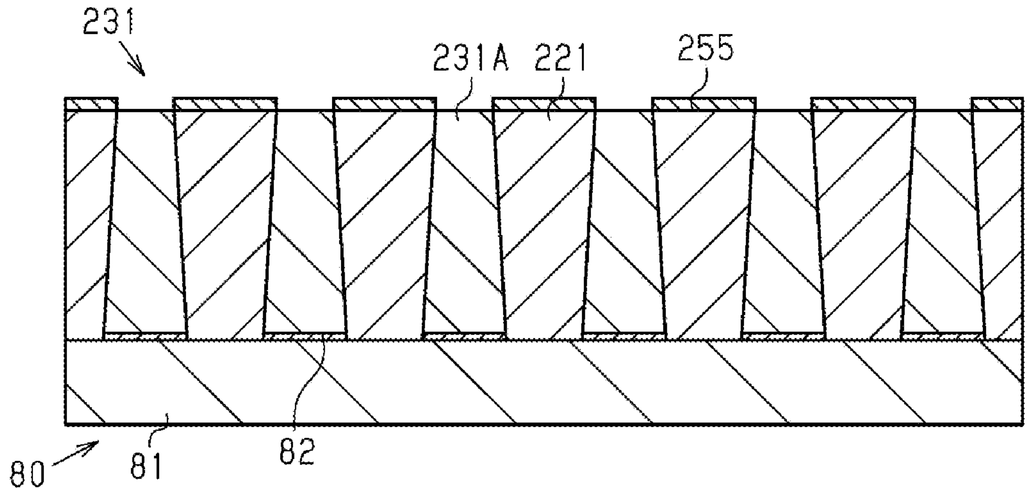
FIG. 27 illustrates the method for manufacturing the inductor component according to the third embodiment.

Next, the insulating layer 255 is formed. As illustrated in FIG. 27, the insulating layer 255 is formed by photolithography to cover a surface including the upper surface of the first magnetic layer 221 and the upper end surfaces of the wire bodies 231A in regions where the first internal terminals 233 are not to be formed. More specifically, the insulating layer 255 is patterned to cover portions other than the upper end surfaces of the wire bodies 231A. In the third embodiment, the insulating layer 255 is made of a solder resist.

Figure 28:
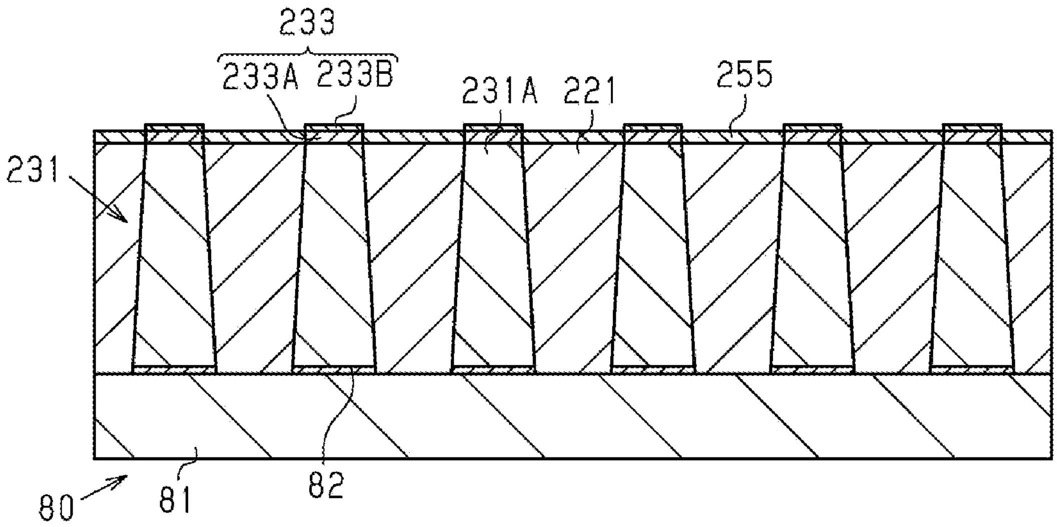
FIG. 28 illustrates the method for manufacturing the inductor component according to the third embodiment.

Next, the first internal terminals 233 are formed. As illustrated in FIG. 28, the anti-corrosion layer 233A made of nickel is formed on the upper end surfaces of the wire bodies 231A by nickel plating. Next, the solder-receiving layer 233B made of gold is formed on the upper surface of the anti-corrosion layer 233A by gold plating. Thus, the first-layer group is formed.

Figure 29:
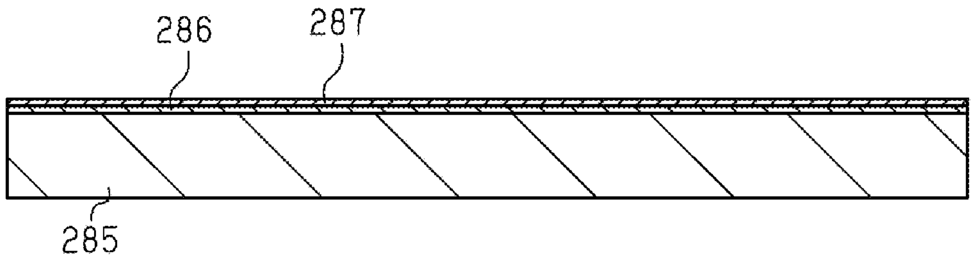
FIG. 29 illustrates the method for manufacturing the inductor component according to the third embodiment.

In addition to the above-described first-layer group, a third-layer group including third layers L23 that are not separated from each other and having no second magnetic layer 261 is formed. As illustrated in FIG. 29, a second-layer base substrate 285 is prepared. The second-layer base substrate 285 is plate-shaped.

Next, an adhesive layer 286 is attached to the upper surface of the second-layer base substrate 285. The adhesive layer 286 is an adhesive sheet that can be removed from the second-layer base substrate 285 after being attached thereto. The adhesive layer 286 also has an adhesive surface at a side opposite to the side adjacent to the second-layer base substrate 285. Thus, the adhesive layer 286 has adhesive surfaces on both sides thereof. Next, copper foil 287 is attached to the upper surface of the adhesive layer 286.

Figure 30:
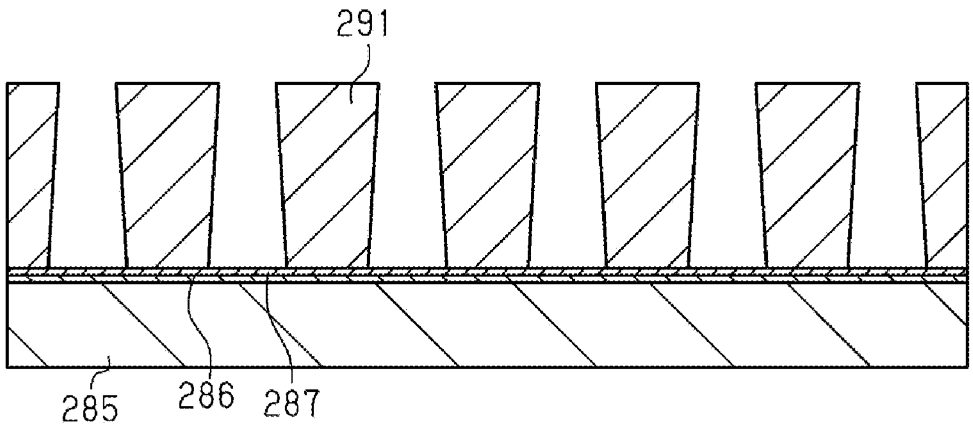
FIG. 30 illustrates the method for manufacturing the inductor component according to the third embodiment.

Next, the second inductor wires 271 are formed on the upper surface of the copper foil 287. First, as illustrated in FIG. 30, a second resist layer 291 is formed by photolithography to cover the upper surface of the copper foil 287 in regions where the second inductor wires 271 are not to be formed. Next, the second inductor wires 271 are formed on the upper surface of the copper foil 287 in regions where the second resist layer 291 is not formed. More specifically, the upper surface of the copper foil 287 is immersed in an electroplating solution to perform electrolytic copper plating so that the second inductor wires 271, which contain about 99 wt % or more of copper, are formed on the upper surface of the copper foil 287. In the third embodiment, the upper end surfaces of the second inductor wires 271 serve as the second internal terminals 273.

Figure 31:
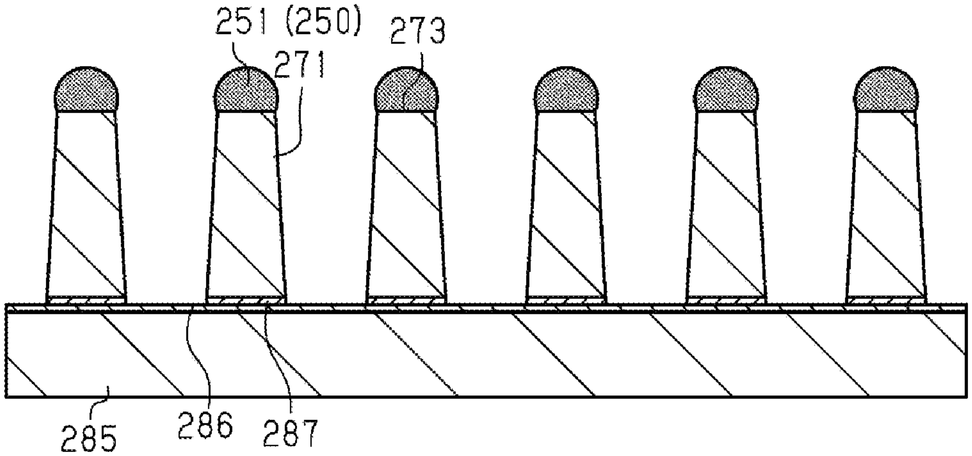
FIG. 31 illustrates the method for manufacturing the inductor component according to the third embodiment.

Next, the second resist layer 291 is removed. Then, as illustrated in FIG. 31, the copper foil 287 is etched to remove portions of the copper foil 287 that are not covered by the second inductor wires 271. Next, the solder portions 251 are connected to the second internal terminals 273. Thus, the third-layer group having no second magnetic layer 261 is formed.

Figure 32:
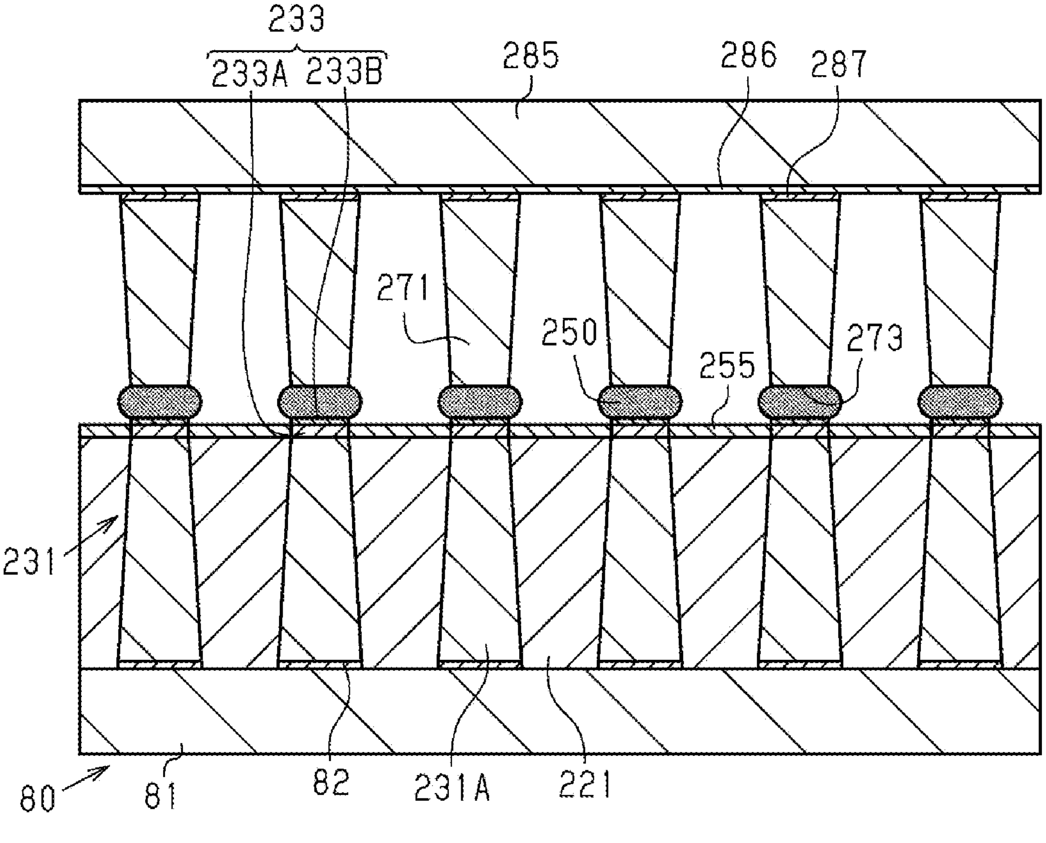
FIG. 32 illustrates the method for manufacturing the inductor component according to the third embodiment.

Next, the above-described first-layer group and the third-layer group including no second magnetic layer 261 are connected together. As illustrated in FIG. 32, first, the third-layer group is laminated onto the first-layer group so that the solder portions 251 of the third-layer group are disposed on the upper surfaces of the first internal terminals 233 of the first-layer group. Then, the solder portions 251 are cooled. Accordingly, the first intermetallic compound portions are formed between the solder portions 251 and the first internal terminals 233. Similarly, the second intermetallic compound portions are formed between the solder portions 251 and the second internal terminals 273. As a result, the boundary portions 250 are formed.

Figure 33:
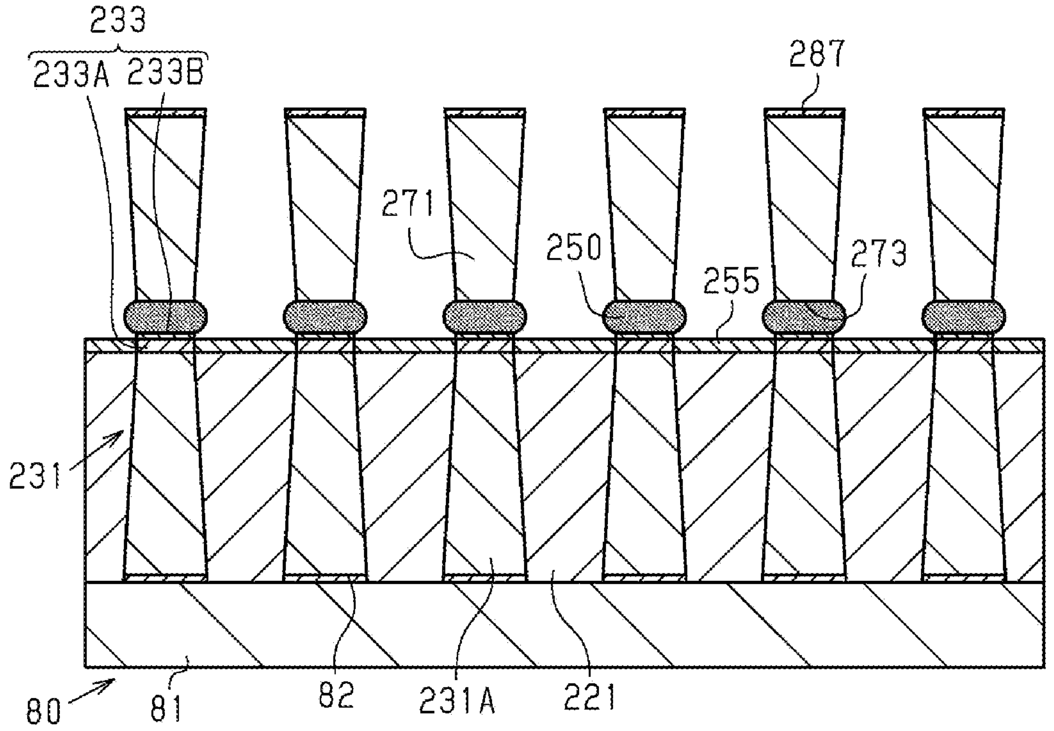
FIG. 33 illustrates the method for manufacturing the inductor component according to the third embodiment.

Next, the second-layer base substrate 285 and the adhesive layer 286 are removed from the copper foil 287. Referring to FIG. 33, portions of the second-layer base substrate 285 and the adhesive layer 286 are physically retained and pulled off so that the adhesive layer 286 is separated from the copper foil 287.

Next, a resin containing magnetic powder, which is the material of the second magnetic layer 261, is applied from above the insulating layer 255. The resin is applied so that the copper foil 287 is entirely covered. Next, the resin containing magnetic powder is pressed and compacted to form the second magnetic layer 261.

Figure 34:
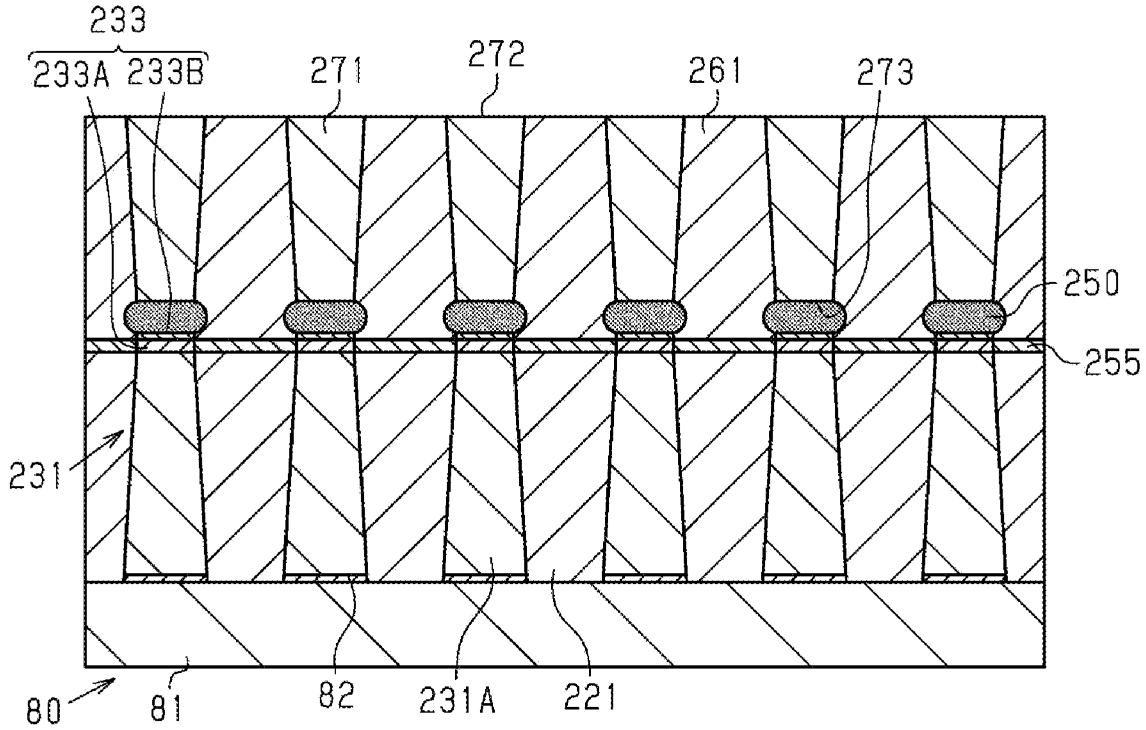
FIG. 34 illustrates the method for manufacturing the inductor component according to the third embodiment.

Next, as illustrated in FIG. 34, in a second-external-terminal forming step, an upper portion of the second magnetic layer 261 is removed. Accordingly, the upper end surfaces of the second inductor wires 271 are exposed so that the second external terminals 272 of the second inductor wires 271 are formed.

Figure 35:
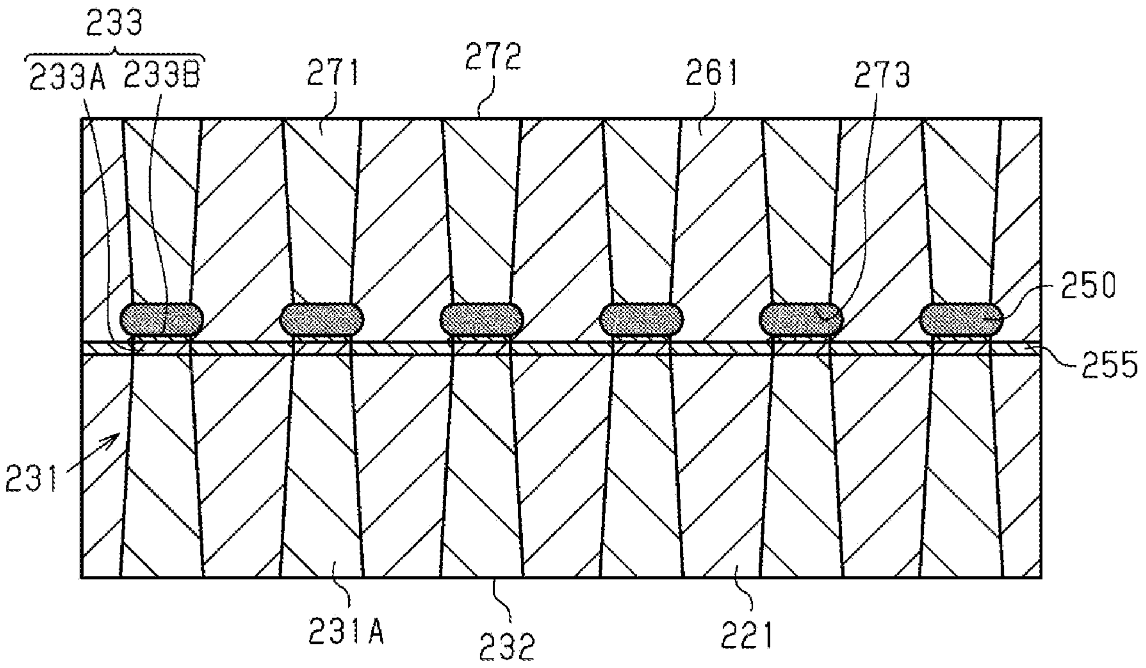
FIG. 35 illustrates the method for manufacturing the inductor component according to the third embodiment.

Next, in a first-external-terminal forming step, the copper-foil-coated base substrate 80 is removed. As illustrated in FIG. 35, the copper-foil-coated base substrate 80 is cut off so that the lower end surfaces of the first inductor wires 231, which are the first external terminals 232, are exposed. In the third embodiment, the copper foil 82 is also entirely cut off so that the lower end surfaces of the first inductor wires 231 in the first magnetic layer 221 are exposed. Then, the first-layer group and the third-layer group that are integrated together are cut along dicing lines that pass through the first magnetic layer 221 and the second magnetic layer 261, and are thereby diced into pieces. Thus, the inductor component 210 is obtained.

Operations and effects of the above-described third embodiment will now be described. The third embodiment provides the following effect in addition to the effects described above in (1-1) to (1-10).

(3-1) According to the above-described third embodiment, the second inductor wires 271 are substantially columnar and extend in the up-down direction. The dimension of the second inductor wires 271 in the up-down direction is less than the dimension of the first inductor wires 231 in the up-down direction. In other words, the dimension of the first inductor wires 231 in the up-down direction differs from the dimension of the second inductor wires 271 in the up-down direction. Therefore, the overall wire length can be adjusted by adjusting the length of the first inductor wires 231 or the length of the second inductor wires 271.

Fourth Embodiment

An inductor component and a method for manufacturing the inductor component according to a fourth embodiment will now be described.

An inductor component 310 according to the fourth embodiment differs from the first embodiment mainly in the boundary portions and the manufacturing method. In the following description, structures similar to those of the first embodiment are denoted by the same reference signs, and description thereof is omitted or simplified.

Figure 36:
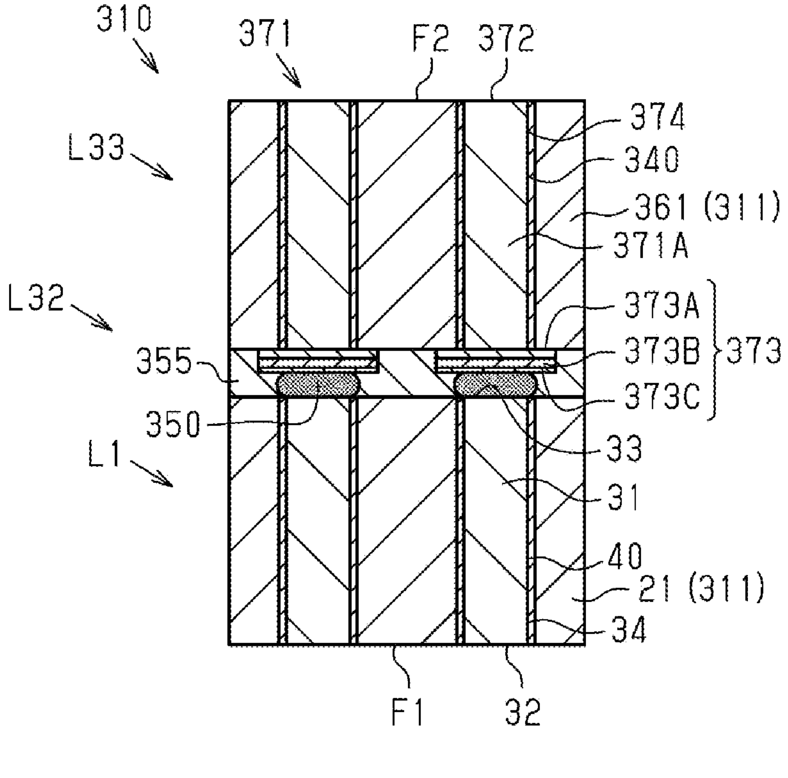
FIG. 36 is a sectional view of an inductor component according to a fourth embodiment.

Referring to FIG. 36, the inductor component 310 has a structure including three layers laminated in a thickness direction. In the following description, a lamination direction in which the three layers are laminated is referred to as an up-down direction.

The fourth embodiment differs from the first to third embodiments in that a second layer L32 includes a buffer layer 355 and that a third layer L33 includes second internal terminals 373 having a three-layer structure.

The third layer L33 includes second inductor wires 371, second insulating films 340, and a second magnetic layer 361. Each of the second inductor wires 371 includes a wire body 371A, a second external terminal 372, and a second internal terminal 373. The wire bodies 371A are substantially cylindrical. Side surfaces of the wire bodies 371A that are orthogonal to a first terminal surface F1 are covered by the second insulating films 340. The material of the second insulating films 340 is the same as the material of the insulating films 40. End surfaces of the wire bodies 371A at an upper side, which is a second side in the direction in which the wire bodies 371A extend, are exposed at a second terminal surface F2, which is the upper surface of the second magnetic layer 361. In the fourth embodiment, the upper end surfaces of the wire bodies 371A serve as the second external terminals 372. In this embodiment, the second magnetic layer 361 of the third layer L3 and the first magnetic layer 21 of the above-described first layer L1 constitute a body 311 of the inductor component 310.

End surfaces of the wire bodies 371A at a lower side, which is a first side in the direction in which the wire bodies 371A extend, are flush with the lower surface of the second magnetic layer 361. The second internal terminals 373 are connected to the lower end surfaces of the wire bodies 371A. The second internal terminals 373 have a three-layer structure including a base layer 373A made of copper, an anti-corrosion layer 373B made of nickel, and a solder-receiving layer 373C made of gold arranged in that order from the side adjacent to the wire bodies 371A. Thus, in the fourth embodiment, the second internal terminals 373 project from the lower surface of the second magnetic layer 361. Although the three layers of the second internal terminals 373 are distinguishable from each other in FIG. 36, the three layers may be integrated such that interfaces and boundaries therebetween are not clear. Gold plating of the solder-receiving layer 373C is dispersed into boundary portions 350. The amount of gold dispersed into the boundary portions 350 is preferably about 1.5 wt % or less. In such a case, the solder portions have a sufficient mechanical strength.

The second internal terminals 373 are substantially circular when viewed in the up-down direction. When viewed in the up-down direction, the diameter of the second internal terminals 373 is greater than the diameter of the wire bodies 371A.

The second layer L32 is disposed between the first layer L1 and the third layer L33. The second layer L32 includes the boundary portions 350 and the buffer layer 355. The boundary portions 350 are disposed between and connected to the first internal terminals 33 and the second internal terminals 373. The boundary portions 350 are substantially circular when viewed in the up-down direction. When viewed in the up-down direction, the circumferences of the boundary portions 350 are smaller than the circumferences of the second internal terminals 373.

The buffer layer 355 is laminated on the upper surface of the first layer L1 in regions other than the regions where the boundary portions 350 are disposed. The buffer layer 355 is in contact with the upper surface of the first magnetic layer 21, and is also in contact with the lower surface of the second magnetic layer 361. The surfaces of the boundary portions 350 and the second internal terminals 373 are covered by the buffer layer 355. Although not illustrated, the buffer layer 355 is made of a resin containing an insulating filler made of an inorganic material and a magnetic filler made of a magnetic material. In the present embodiment, the insulating filler is made of an acicular non-magnetic material. More specifically, the material of the insulating filler is silica. The magnetic filler is made of a spherical magnetic material. More specifically, the material of the magnetic filler is magnetic metal powder.

A method for manufacturing the inductor component 310 according to the fourth embodiment will now be described.

To manufacture the inductor component 310, first, a first-layer group including first layers L1 that are not separated from each other is formed. The first-layer group is formed similarly to the first-layer group of the above-described first embodiment.

In addition to the first-layer group, a third-layer group including third layers L33 that are not separated from each other is formed. First, similarly to the process of forming the first-layer group of the above-described first embodiment, the wire bodies 371A of the second inductor wires 371 and the second insulating films 340 are formed by using columnar metal members P. Then, the second external terminals 372 are formed so that the end surfaces of the wire bodies 371A at the upper side, which is the second side in the direction in which the wire bodies 371A extend, are exposed at the upper surface of the second magnetic layer 361. In addition, the lower portion of the second magnetic layer 361 is ground so that the end surfaces of the wire bodies 371A at the lower side, which is the first side in the direction in which the wire bodies 371A extend, are flush with the lower surface of the second magnetic layer 361.

Figure 37:
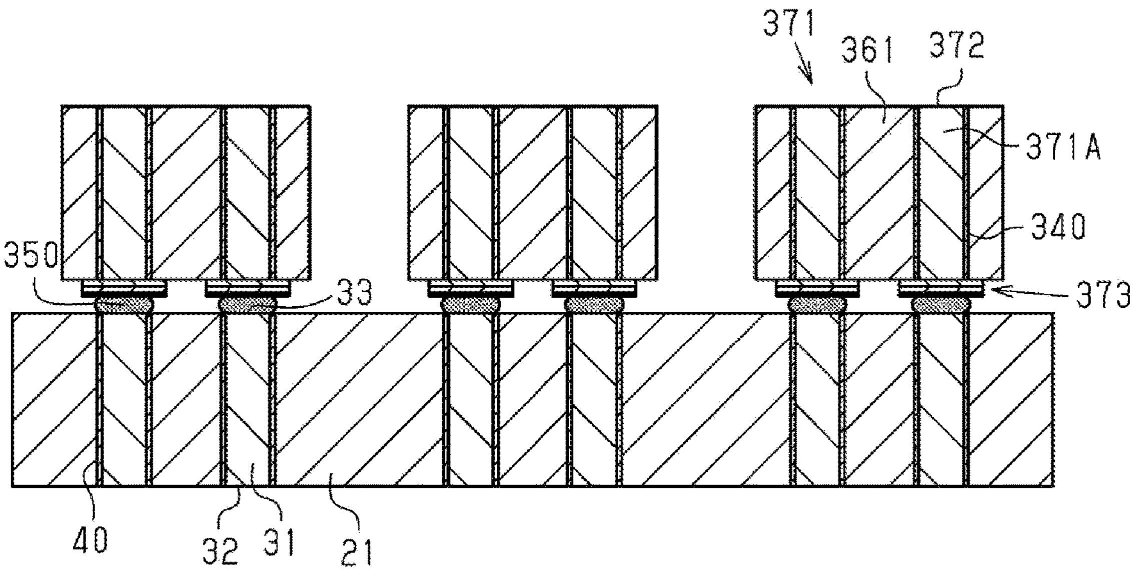
FIG. 37 illustrates a method for manufacturing the inductor component according to the fourth embodiment.

Then, as illustrated in FIG. 37, the second internal terminals 373 are formed on the lower end surfaces of the wire bodies 371A. More specifically, first, the base layer 373A made of copper is formed to cover the end surfaces of the wire bodies 371A by copper plating. Next, the anti-corrosion layer 373B made of nickel is formed on the surface of the base layer 373A by nickel plating. Next, the solder-receiving layer 373C made of gold is formed on the surface of the anti-corrosion layer 373B by gold plating. As a result, the second internal terminals 373 having a three-layer structure are formed. Thus, in the fourth embodiment, the second internal terminals 373 project from the lower surface of the second magnetic layer 361. Then, the third-layer group is diced into pieces, so that the third layers L33 including the second internal terminals 373 are formed.

Next, the solder portions 351 containing tin are placed on the upper surfaces of the first internal terminals 33 of the first-layer group. Then, the third layers L33 are laminated onto the first-layer group so that the second internal terminals 373 are positioned above the solder portions 351. Thus, the solder portions 351 are connected to the second internal terminals 373. Then, the solder portions 351 are cured to form the boundary portions 350. At this time, first intermetallic compound portions made of an alloy containing tin and copper are formed between the solder portions 351 and the first internal terminals 33. In addition, second intermetallic compound portions made of an alloy containing tin and gold are formed between the solder portions 351 and the second internal terminals 373. Thus, the boundary portions 350 including these intermetallic compound portions are formed.

Figure 38:
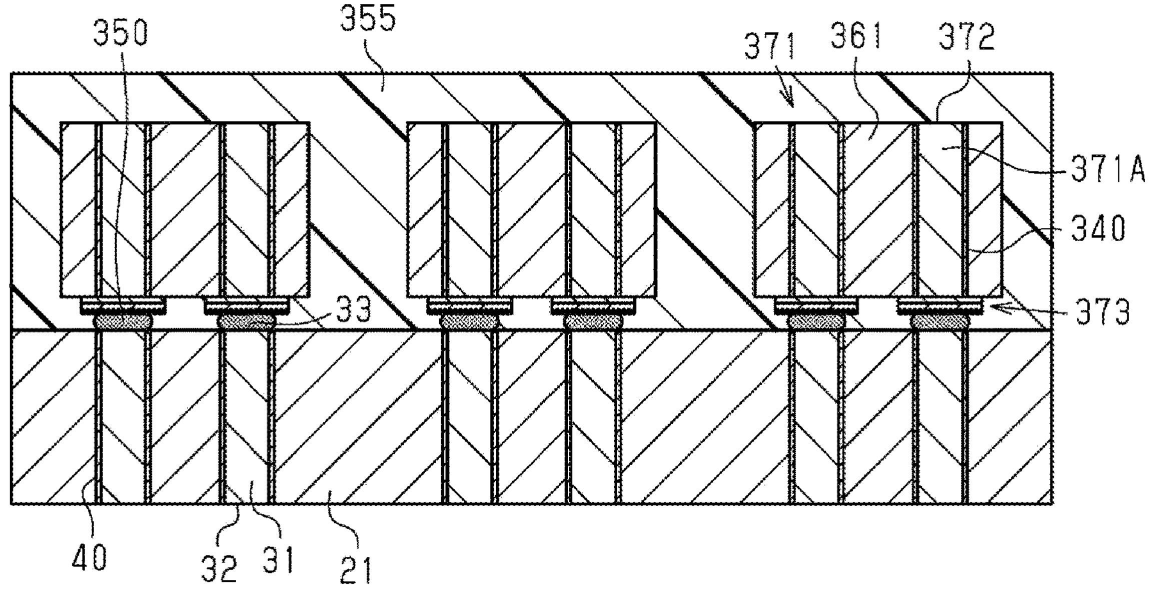
FIG. 38 illustrates the method for manufacturing the inductor component according to the fourth embodiment.

Then, in the fourth embodiment, as illustrated in FIG. 38, a resin containing an insulating filler, which is the material of the buffer layer 355, is applied from above the first layers L1. The resin containing the insulating filler is applied so that the upper surfaces of the third layers L3 are also covered. Next, the resin containing the insulating filler is pressed and compacted to form the buffer layer 355.

Figure 39:
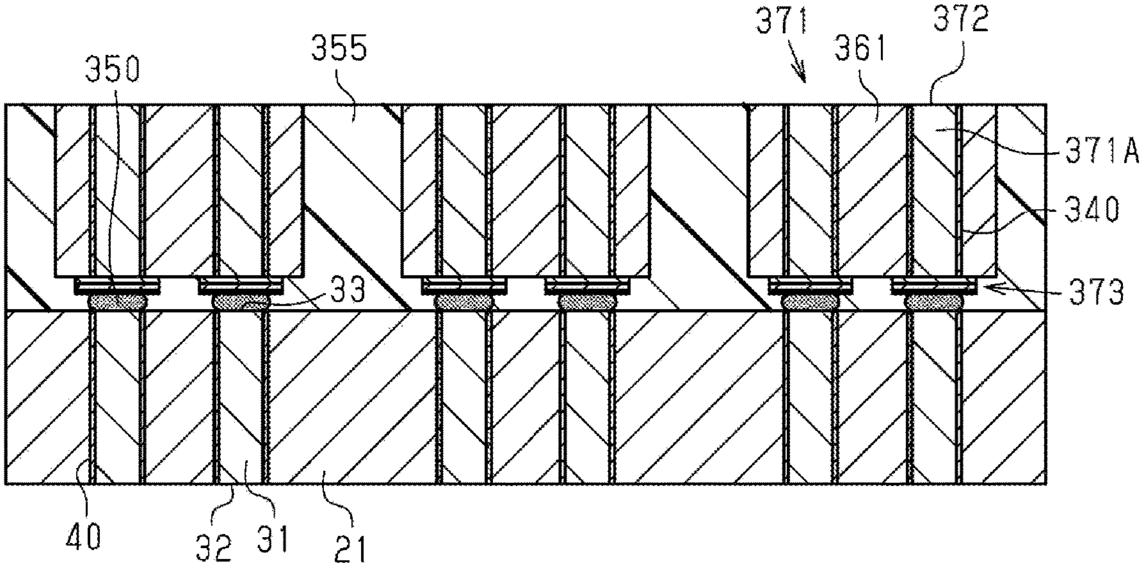
FIG. 39 illustrates the method for manufacturing the inductor component according to the fourth embodiment.

Next, the upper portion of the buffer layer 355 is cut off. As illustrated in FIG. 39, the buffer layer 355 is cut off so that the second external terminals 372 of the second inductor wires 371 are exposed.

Figure 40:
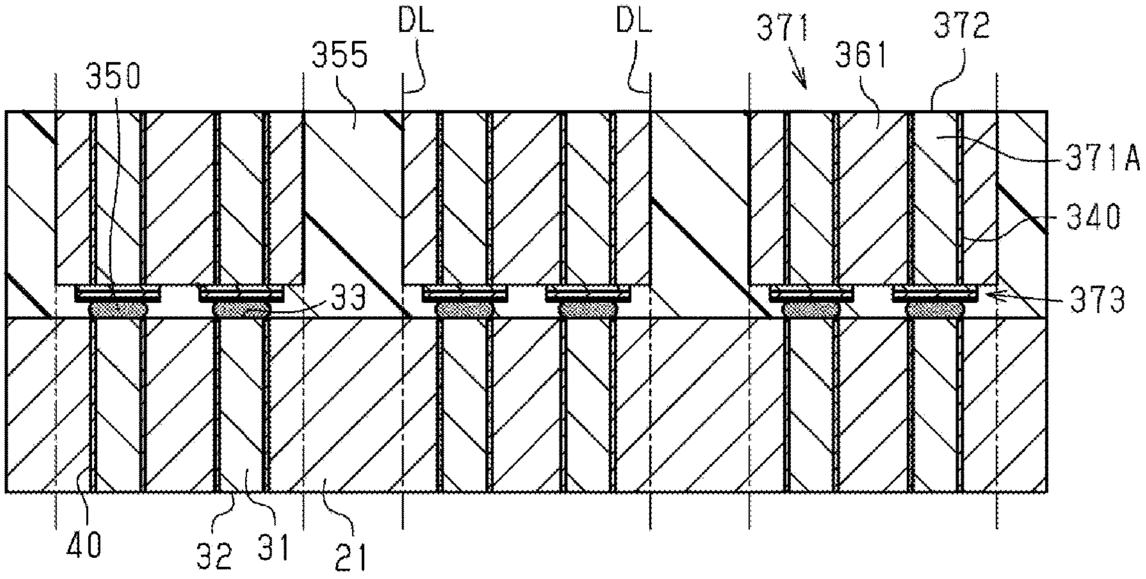
FIG. 40 illustrates the method for manufacturing the inductor component according to the fourth embodiment.

Then, as illustrated in FIG. 40, the first-layer group and the third layers L33 that are integrated together are cut along dicing lines DL that extend along the boundaries between the buffer layer 355 and the second magnetic layer 361, and are thereby diced into pieces. Thus, the inductor component 310 is formed.

Operations and effects of the above-described fourth embodiment will now be described. The fourth embodiment provides the following effects in addition to the effects described above in (1-1) to (1-8) and (1-10).

(4-1) According to the above-described fourth embodiment, the boundary portions 350 are disposed within the second internal terminals 373 when viewed in the direction orthogonal to the first terminal surface F1. In other words, when viewed in the up-down direction, the boundary portions 350 are smaller than the second inductor wires 371. Therefore, interference between the boundary portions 350 disposed in the same layer can be suppressed.

(4-2) According to the above-described fourth embodiment, side surfaces of the boundary portions 350 that are orthogonal to the first terminal surface F1 are in contact with the buffer layer 355 containing a resin. Therefore, concentration of thermal stress at the boundary portions 350 can be reduced.

(4-3) According to the above-described fourth embodiment, the buffer layer 355 contains the insulating filler. The insulating filler contained in the buffer layer 355 is also present on the surfaces of the buffer layer 355 that are in contact with the boundary portions 350. Therefore, portions of the insulating filler penetrate into the boundary portions 350, so that the buffer layer 355 is strongly connected to the boundary portions 350.

(4-4) According to the above-described fourth embodiment, the buffer layer 355 contains the magnetic filler made of a magnetic material. The magnetic filler is also contained in the first magnetic layer 21 and the second magnetic layer 361. Therefore, the buffer layer 355 has a coefficient of linear expansion close to those of the first magnetic layer 21 and the second magnetic layer 361. Accordingly, differences in the amount of thermal expansion can be reduced, so that the residual stress can be reduced.

(4-5) According to the above-described fourth embodiment, the buffer layer 355 is in contact with the first magnetic layer 21 and the second magnetic layer 361. Thus, the buffer layer 355 is disposed between the first magnetic layer 21 and the second magnetic layer 361, and is therefore not easily separated from the boundary portions 350.

Fifth Embodiment

An embodiment of an inductor structure including an inductor component according to any one of the first to fourth embodiments as a component thereof will now be described. An inductor-component mounting board including inductor components 10 structured as described in the first embodiment will be described as an example of an inductor structure. In this embodiment, structures similar to those of the first embodiment are denoted by the same reference signs, and description thereof is thus omitted.

Figure 41:
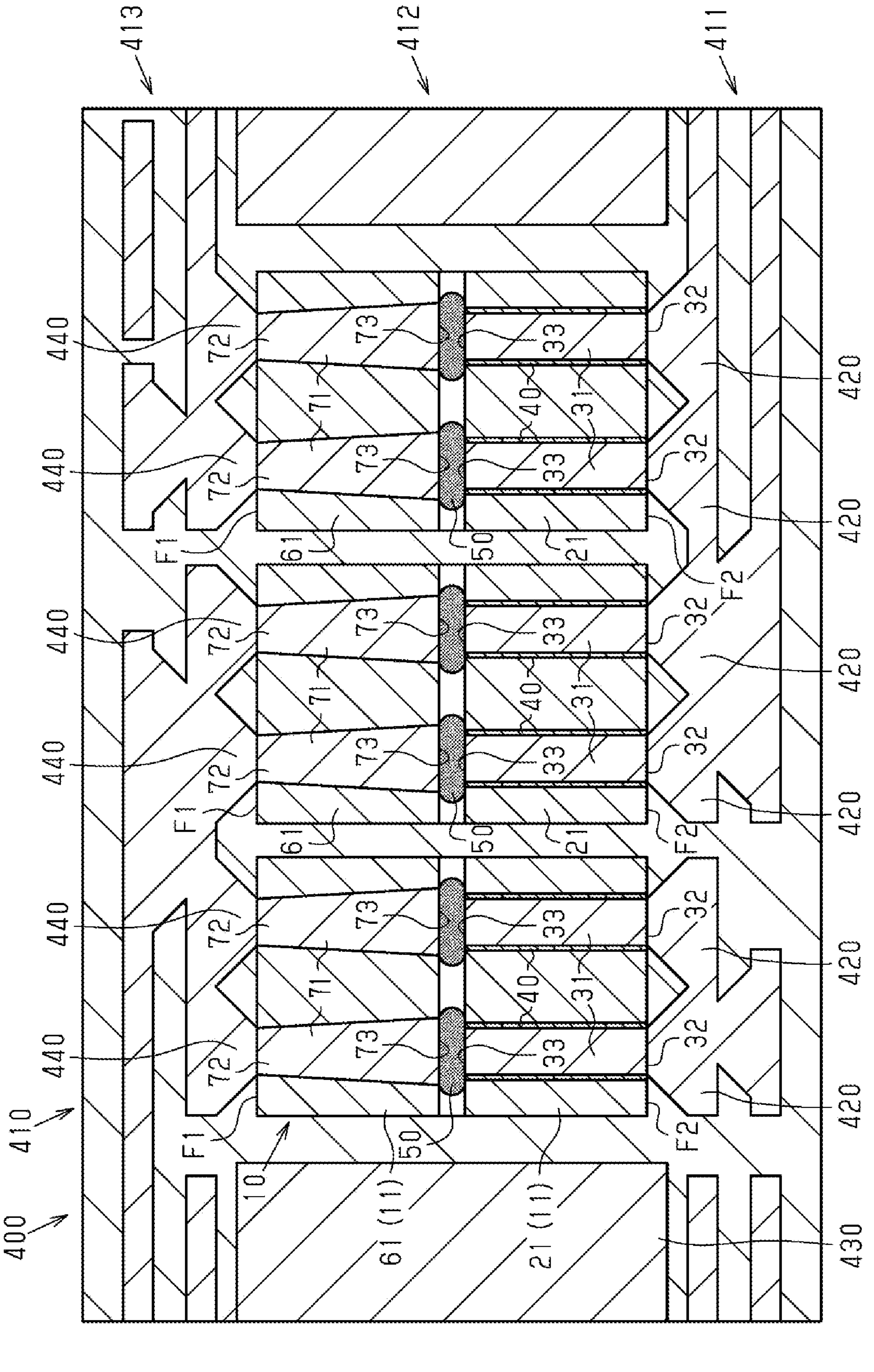
FIG. 41 is a sectional view of an inductor-component mounting board according to an embodiment.

As illustrated in FIG. 41, an inductor-component mounting board 400 includes the inductor components 10 and a substrate 410 to which the inductor components 10 are electrically connected. In the present embodiment, the inductor components 10 are disposed in the substrate 410.

In the fifth embodiment, the substrate 410 basically includes a first substrate layer 411, a second substrate layer 412, and a third substrate layer 413.

The first substrate layer 411 is plate-shaped, and a plurality of input wires 420 are disposed in the first substrate layer 411. Although not illustrated, a first end of each input wire 420 is connected to a high-potential terminal of a direct-current power supply. A second end of each input wire 420 is exposed at the upper surface of the first substrate layer 411.

The second substrate layer 412 is laminated on the upper surface of the first substrate layer 411. The second substrate layer 412 is plate-shaped overall, and a core member 430, for example, is disposed in the second substrate layer 412. The inductor components 10 are also disposed in the second substrate layer 412. In the present embodiment, three inductor components 10 are disposed in the second substrate layer 412. The inductor components 10 are arranged so that the first end of each input wire 420 is in contact with a corresponding one of the first external terminals 32 of the inductor components 10. Therefore, the number of input wires 420 is equal to the number of first external terminals 32. An input voltage is supplied from the input wires 420 to the first external terminals 32 of the inductor components 10.

The third substrate layer 413 is laminated on the upper surface of the second substrate layer 412. The third substrate layer 413 is plate-shaped overall. A plurality of output wires 440 are disposed in the third substrate layer 413. A first end of each output wire 440 is in contact with a corresponding one of the second external terminals 72 of the inductor components 10. Therefore, the number of output wires 440 is equal to the number of second external terminals 72. Although not illustrated, a second end of each output wire 440 is connected to a low-potential terminal of the direct-current power supply. An output voltage is supplied from the second external terminals 72 of the inductor components 10 to the output wires 440.

End surfaces of the input wires 420 that are connected to the first external terminals 32 and end surfaces of the output wires 440 that are connected to the second external terminals 72 are at the same positions and have the same size when viewed in a height direction Td. Therefore, these end surfaces completely overlap when viewed in the height direction Td.

Operations and effects of the above-described fifth embodiment will now be described. The fifth embodiment provides the following effects in addition to the effects described above in (1-1) to (1-12).

(5-1) The inductor-component mounting board 400 according to the fifth embodiment is configured such that the first terminal surfaces F1 of the inductor components 10 are placed on the first substrate layer 411 of the substrate 410, and the second terminal surfaces F2 of the inductor components 10 are placed on the third substrate layer 413 of the substrate 410. In addition, the first external terminals 32 of the inductor components 10 are connected to the input wires 420, and the second external terminals 72 of the inductor components 10 are connected to the output wires 440. When viewed in the height direction Td, the end surfaces of the input wires 420 that are connected to the first external terminals 32 and the end surfaces of the output wires 440 that are connected to the second external terminals 72 overlap. Therefore, the inductor components 10 can be mounted on the substrate 410 as long as the substrate 410 has an area for receiving the first external terminals 32 at a minimum when viewed in the up-down direction.

The above-described embodiments may be modified as described below. The above-described embodiments and modifications described below may be applied in combination as long as there is no technical contradiction.

In the above-described embodiments, the structure of the body of each inductor component is not limited to those in the embodiments. In the first embodiment, the body 11 may have any structure as long as the body 11 includes at least the first magnetic layer 21, the second magnetic layer 61, the first terminal surface F1, and the second terminal surface F2. For example, the body 11 may include a solder resist in addition to the first magnetic layer 21 and the second magnetic layer 61. In such a case, the solder resist may be disposed to cover the lower surface of the first magnetic layer 21 in the height direction Td and the upper surface of the second magnetic layer 61 in the height direction Td, and may have outer surfaces that serve as the first terminal surface F1 and the second terminal surface F2. In addition, the body 11 may be structured such that the first magnetic layer 21 and the second magnetic layer 61 are spaced from each other as in the first embodiment as long as the first magnetic layer 21 and the second magnetic layer 61 are laminated together.

In the above-described embodiments, the inductor wires may be any wires as long as magnetic flux is generated in the magnetic layers so that the inductor component exhibits inductance when a current flows through the wires.

In the above-described embodiments, the number of pairs of first and second inductor wires is not limited to that in the embodiments. A single inductor component may include less than three pairs of inductor wires or five or more pairs of inductor wires. The number of pairs of inductor wires included in a single inductor component may be changed by changing the positions of dicing lines in the dicing process.

In the above-described embodiments, when a single inductor component includes a plurality of pairs of first and second inductor wires, it is not necessary that all of the pairs have the same dimensions. For example, the boundary portions may be disposed at different positions in the up-down direction or have different sizes when viewed in the up-down direction. In such a case, when the boundary portions are displaced from each other, interference between adjacent pairs of inductor wires can be easily prevented. For example, when, as in the third embodiment, the longitudinal dimension of the first inductor wires 231 differs from the longitudinal dimension of the second inductor wires 271, the positions of the boundary portions 250 in the up-down direction can be adjusted.

In the above-described embodiments, it is not necessary that the surfaces of the inductor wires that extend in the extending direction of the inductor wires be entirely covered by the magnetic layers. For example, portions of the surfaces of the inductor wires that extend in the extending direction of the inductor wires may be exposed at outer surfaces of the magnetic layers.

In the above-described embodiments, the shape of the inductor wires is not limited to a substantially cylindrical shape, and may instead be, for example, a substantially polygonal columnar shape, such as a substantially quadrangular columnar shape, a substantially elliptical cylindrical shape, or a substantially truncated conical or pyramidal shape.

In the above-described embodiments, the shape of the inductor wires is not limited to a substantially columnar shape. For example, in the case where each inductor wire has a substantially square columnar shape, the smallest circle enclosing the inductor wire when viewed in the up-down direction is a circumcircle of a square. In such a case, the dimension of the inductor wire in the up-down direction is preferably greater than the diameter of the circumcircle, so that the overall size of the inductor component can be reduced. Similarly, although each inductor wire is preferably substantially columnar so that the inductor wire can be easily disposed to extend linearly in the direction from the first terminal surface F1 toward the second terminal surface F2, the inductor wire may include curved or helical portions as long as the inductor wire extends linearly overall. For example, the inductor wire may include helically wound portions or meandering portions as long as the inductor wire extends linearly overall. When, for example, the inductor wire is wound around a winding center that extends in the up-down direction, the smallest circle enclosing the inductor wire when viewed in the up-down direction is greater than the circle obtained by rotating the inductor wire. In such a case, the dimension of the inductor wire in the up-down direction is preferably greater than the diameter of the smallest circle enclosing the inductor wire when viewed in the up-down direction, so that the overall size of the inductor component can be reduced.

In the above-described embodiments, it is not necessary that the first external terminals and the second external terminals completely overlap when viewed in the up-down direction. The first external terminals may partially overlap the second external terminals or be completely separated from the second external terminals when viewed in the up-down direction. In the case where the first external terminals and the second external terminals at least partially overlap when viewed in the up-down direction, the occupation area on a substrate at the side adjacent to the terminals can be reduced.

In the above-described embodiments, the structures of the first and second external terminals are not limited to those in the embodiments. For example, the external terminals may have a three-layer structure similar to that of the second internal terminals 273 of the fourth embodiment. In such a case, the thickness of the external terminals can be easily adjusted due to the base layer made of copper. In addition, electromigration can be reduced due to the anti-corrosion layer made of nickel. In addition, since the external terminals have a solder-receiving layer made of gold, satisfactory solder wettability can be easily obtained when the external terminals are connected to a substrate with solder. The solder-receiving layer may instead be made of tin.

The first and second external terminals may be configured such that the first external terminals are composed of plating layers as described above while the second external terminals are formed by exposing end surfaces of the second inductor wires in the extending direction at a terminal surface, or such that the second external terminals are composed of plating layers as described above while the first external terminals are formed by exposing end surfaces of the first inductor wires in the extending direction at a terminal surface.

When the external terminals have a multilayer structure, the external terminals preferably include at least one of the anti-corrosion layer and the solder-receiving layer described above. In such a case, electromigration can be reduced or satisfactory solder wettability can be obtained due to the above-described layers.

When the first external terminals are components separate from the first inductor wires or when the second external terminals are components separate from the second inductor wires, the first external terminals 32 and the second external terminals 72 are preferably in direct contact with the respective inductor wires. When the first external terminals 32 and the second external terminals 72 are in direct contact with the respective inductor wires, additional wires connected to the inductor wires are not necessary. Therefore, the overall electrical resistance and the overall height of the inductor component can be reduced.

In the above-described embodiments, the first external terminals are not necessarily flush with the first terminal surface F1. For example, the first external terminals may be disposed at a position recessed inward from the first terminal surface F1. In such a case, when the inductor component is mounted on a substrate, the inductor component can be easily positioned by engaging the recessed portions with projecting portions of the substrate. This also applies to the positional relationship between the second external terminals and the second terminal surface F2.

The first external terminals may instead be disposed at a position projecting outward from the first terminal surface F1. In such a case, when the inductor component is mounted on a substrate, the inductor component can be easily positioned by fitting the projecting portions to recessed portions of the substrate. This also applies to the positional relationship between the second external terminals and the second terminal surface F2.

In the above-described embodiments, the outer shape of the inductor component is not limited to that in the above-described embodiments. For example, the inductor component may have a substantially cylindrical shape or a substantially polygonal columnar shape.

In the above-described embodiments, the material of the magnetic layers is not limited to that in the embodiments. For example, the magnetic metal powder may instead be powder of nickel, chromium, copper, aluminum, or an alloy thereof. In addition, the resin containing the magnetic metal powder is preferably a polyimide resin, an acrylic resin, or a phenolic resin in terms of insulation and formability, but is not limited to this and may instead be, for example, an epoxy resin. When each magnetic layer is made of a resin containing magnetic metal powder, the ratio of the weight of the magnetic metal powder contained in the magnetic layer to the overall weight of the magnetic layer is preferably greater than or equal to about 60 wt %. In addition, to improve the filling properties of the resin containing magnetic metal powder, the resin preferably contains two or three types of magnetic metal powder having different grain size distributions. Furthermore, the material of the magnetic layers may be a resin containing ferrite powder instead of magnetic metal powder or a resin containing both magnetic metal powder and ferrite powder.

Figure 42:
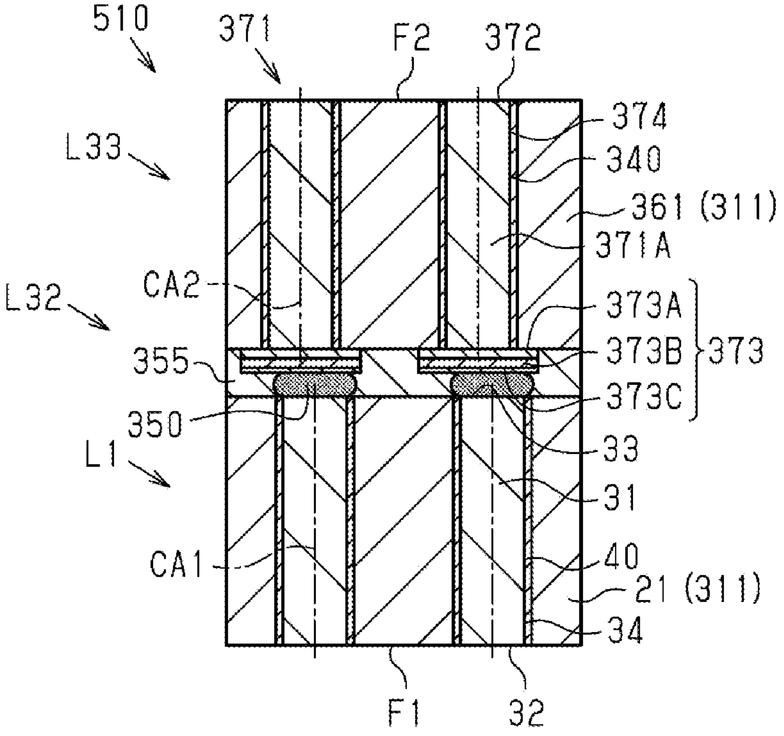
FIG. 42 is a sectional view of an inductor component according to a modification.

In the above-described embodiments, the central axes of the first inductor wires may be displaced from the central axes of the second inductor wires. FIG. 42 illustrates an example in which an inductor component 510 is structured such that longitudinal central axes CA1 of first inductor wires 31 are displaced from longitudinal central axes CA2 of the second inductor wires 371. In this case, the overall length of the inductor wires can be increased while distances to wires surrounding the inductor component 510 are secured. In addition, when connection ends of the input wires are slightly displaced from the output wires, additional wires are not necessary. Therefore, the design flexibility can be increased.

The manner in which each inductor component is mounted on a substrate is not limited to that in the fifth embodiment. For example, each inductor component may be mounted such that the first terminal surface F1 of the inductor component is connected to an upper surface of a substrate and that the second terminal surface F2 of the inductor component is connected to another component, such as a sub-module.

In the above-described embodiments, the boundary portions do not necessarily include the intermetallic compound portions. For example, the boundary portions may be composed only of solder portions. When the boundary portions include the intermetallic compound portions, it is not necessary that the intermetallic compound portions be substantially layer-shaped and have a uniform thickness. The boundary portions may have any structure as long as the boundary portions serve as physical boundaries between the first inductor wires and the second inductor wires that are components separate from the first inductor wires.

In the above-described embodiments, the thickness of the boundary portions is not limited to that in the embodiments. For example, in the case where the first inductor wires are helical as in the above-described modification, the thickness of the boundary portions may be greater than or equal to about one-tenth of the diameter of the smallest circles enclosing the end surfaces of the first internal terminals that face the boundary portions when viewed in the direction orthogonal to the first terminal surface. Also in this case, the thickness of the boundary portions is appropriately large relative to the exposed area of the first internal terminals, so that sufficient connection strength can be obtained.

The boundary-portion forming step may be performed either before or after the second-internal-terminal forming step as long as the boundary portions are formed to connect the first internal terminals of the first inductor wires to the second internal terminals of the second inductor wires.

The material of the insulating films 40 according to the first embodiment is not limited to that in the embodiments. For example, the insulating films 40 may be made of a polyimide resin, an acrylic resin, a phenolic resin, or a combination of these resins and an epoxy resin. In addition, an inorganic filler, such as silica or barium sulfate, may be mixed in these resins. This also applies to the second insulating films 340 according to the fourth embodiment.

The buffer layer 355 according to the fourth embodiment preferably contains a magnetic filler made of an acicular magnetic material and an insulating filler made of a spherical non-magnetic material. However, the buffer layer 355 may instead contain one or neither of the magnetic filler and the insulating filler. The buffer layer 355 may contain a magnetic filler made of a spherical magnetic material.

Figure 43:
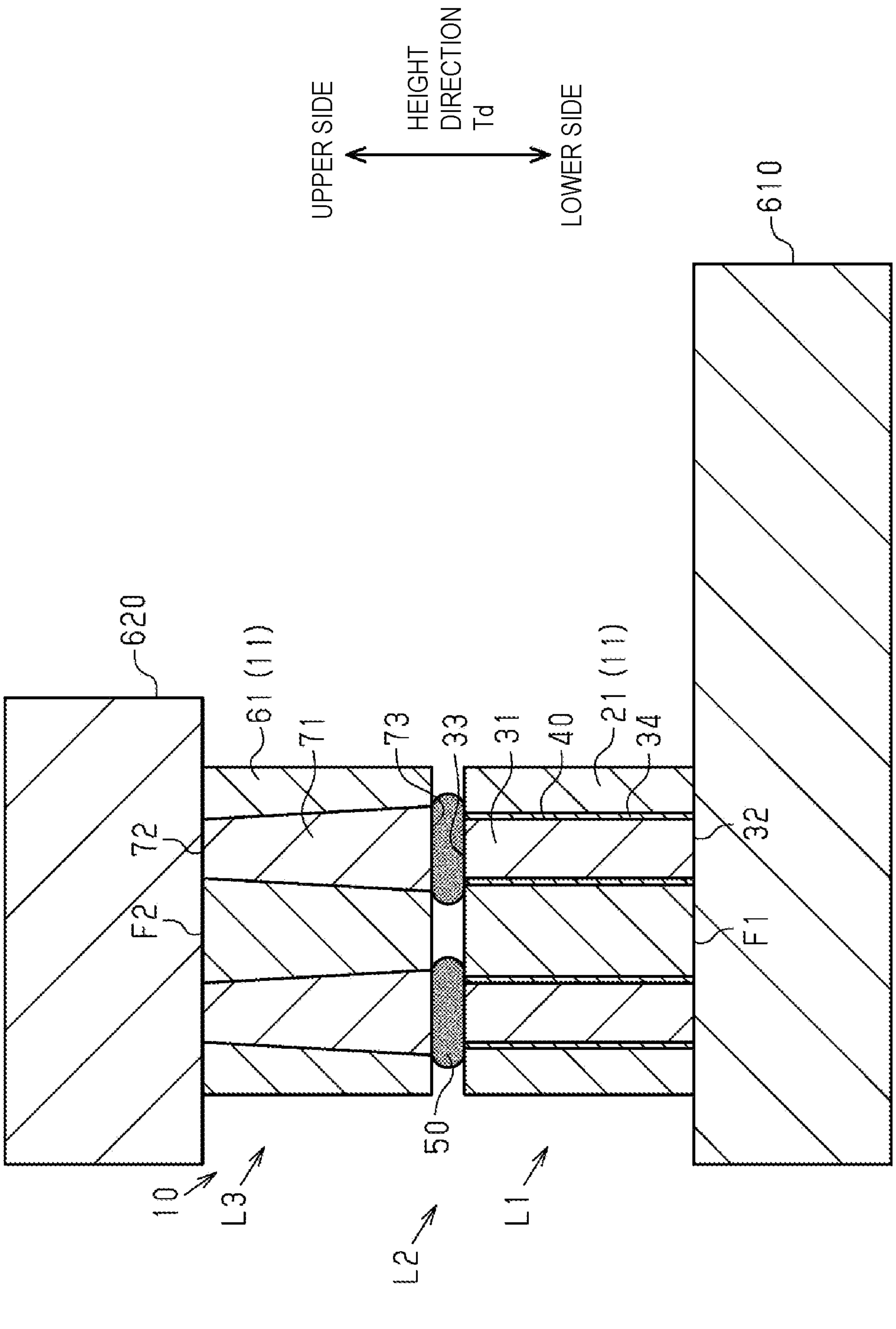
FIG. 43 is a sectional view of an inductor structure according to a modification.

The configuration of the inductor structure is not limited to that of the inductor-component mounting board in the above-described embodiment. For example, FIG. 43 illustrates an example of an inductor structure in which the inductor component 10 is mounted such that the first terminal surface F1 of the inductor component 10 is connected to an upper surface of a substrate 610. The substrate 610 includes input wires (not illustrated) for applying an input voltage, and the input wires are connected to the first external terminals 32 of the inductor component 10. The second terminal surface F2 of the inductor component 10 is connected to another electronic component 620, such as a sub-module. The electronic component 620 includes output wires (not illustrated) for applying an output voltage, and the output wires are connected to the second external terminals 72 of the inductor component 10. Thus, the input wires and the output wires may be provided on different components, such as the substrate 610 and the electronic component 620.

In the example illustrated in FIG. 43, the surface on which the inductor component 10 is mounted is not limited to the upper surface of the substrate 610, and may instead be a mounting surface of the electronic component 620 or a substrate. In addition, another electronic component may be interposed between the substrate 610 and the inductor component 10.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a body including a first magnetic layer including a magnetic material and a second magnetic layer laminated on the first magnetic layer and including a magnetic material;

the body having a first terminal surface and a second terminal surface at a side opposite to the first terminal surface in a lamination direction in which the first magnetic layer and the second magnetic layer are laminated;

a first inductor wire that extends linearly in the lamination direction in the first magnetic layer, wherein the first inductor wire is a first columnar inductor wire;

a first external terminal provided at a first end of the first inductor wire and exposed only at the first terminal surface;

a first internal terminal provided at a second end of the first inductor wire, the second end being opposite to the first end of the first inductor wire;

a second inductor wire that extends linearly in the lamination direction in the second magnetic layer, wherein the second inductor wire is a second columnar inductor wire;

a second internal terminal provided at a first end of the second inductor wire;

a second external terminal provided at a second end of the second inductor wire and exposed only at the second terminal surface, the second end being opposite to the first end of the second inductor wire; and a boundary portion that connects the first internal terminal and the second internal terminal to each other and is configured as a physical boundary between the first inductor wire and the second inductor wire.

2. The inductor component according to claim 1, wherein the first inductor wire and the second inductor wire are arranged in the lamination direction.

3. The inductor component according to claim 1, wherein the first inductor wire and the second inductor wire at least partially overlap when viewed in the lamination direction.

4. The inductor component according to claim 1, wherein the first external terminal and the second external terminal at least partially overlap when viewed in the lamination direction.

5. The inductor component according to claim 1, wherein the first inductor wire includes a material containing copper as a largest constituent thereof, and the boundary portion includes a material different from the material of the first inductor wire.

6. The inductor component according to claim 5, wherein the boundary portion includes an intermetallic compound portion that is adjacent to the first inductor wire.

7. The inductor component according to claim 5, wherein the material of the boundary portion contains a tin of from 50 wt % to 99 wt %.

8. The inductor component according to claim 3, wherein a distance between the first internal terminal and the second internal terminal in the lamination direction is greater than or equal to one-tenth of a diameter of a smallest circle enclosing an end surface of the first inductor wire at the second end of the first inductor wire, and the distance is less than or equal to one-third of a maximum dimension of the first inductor wire in the lamination direction.

9. The inductor component according to claim 1, wherein the first inductor wire includes a material containing copper as a largest constituent thereof, and wherein the boundary portion includes a material containing copper as a largest constituent thereof.

10. The inductor component according to claim 9, wherein a thickness of the boundary portion in the lamination direction is from 1 nm to 10 μm.

11. The inductor component according to claim 1, wherein a maximum area of the boundary portion when viewed in the lamination direction is greater than a maximum cross-sectional area of the first inductor wire and the second inductor wire along a plane orthogonal to the lamination direction.

12. The inductor component according to claim 1, wherein a maximum area of the boundary portion when viewed in the lamination direction is smaller than an end surface of the first internal terminal that is adjacent to the boundary portion when viewed in the lamination direction, and the maximum area of the boundary portion when viewed in the lamination direction is smaller than an end surface of the second internal terminal that is adjacent to the boundary portion when viewed in the lamination direction.

13. The inductor component according to claim 1, wherein a longitudinal central axis of the first inductor wire is displaced from a longitudinal central axis of the second inductor wire when viewed in the lamination direction.

14. The inductor component according to claim 1, wherein a longitudinal dimension of the first inductor wire differs from a longitudinal dimension of the second inductor wire.

15. The inductor component according to claim 1, wherein a diameter of a smallest circle enclosing the first inductor wire when viewed in the lamination direction differs from a diameter of a smallest circle enclosing the second inductor wire when viewed in the lamination direction.

16. The inductor component according to claim 1, wherein the first inductor wire extends in the lamination direction, and a cross-sectional area of the first inductor wire along a plane orthogonal to the lamination direction differs depending on a position of the first inductor wire in the lamination direction.

17. The inductor component according to claim 1, wherein, among outer surfaces of the boundary portion, a side surface other than a surface in contact with the first internal terminal and other than a surface in contact with the second internal terminal is in contact with a buffer layer containing a resin.

18. The inductor component according to claim 17, wherein the buffer layer contains at least one of a filler including a magnetic material and a filler including a non-magnetic material.

19. The inductor component according to claim 17, wherein a surface of the buffer layer that is adjacent to the first terminal surface is in contact with the first magnetic layer, and a surface of the buffer layer that is adjacent to the second terminal surface is in contact with the second magnetic layer.

20. An inductor structure comprising:

an inductor component including:

a body including a first magnetic layer including a magnetic material and a second magnetic layer laminated on the first magnetic layer and including a magnetic material, the body having a first terminal surface and a second terminal surface at a side opposite to the first terminal surface in a lamination direction in which the second magnetic layer is laminated on the first magnetic layer, a first inductor wire that extends linearly in the lamination direction in the first magnetic layer, wherein the first inductor wire is a first columnar inductor wire, a first external terminal provided at a first end of the first inductor wire and exposed only at the first terminal surface, a first internal terminal provided at a second end of the first inductor wire, the second end being opposite to the first end of the first inductor wire, a second inductor wire that extends linearly in the lamination direction in the second magnetic layer, wherein the second inductor wire is a second columnar inductor wire, a second internal terminal provided at a first end of the second inductor wire, a second external terminal provided at a second end of the second inductor wire and exposed only at the second terminal surface, the second end being opposite to the first end of the second inductor wire, and a boundary portion that connects the first internal terminal and the second internal terminal to each other and is configured as a physical boundary between the first inductor wire and the second inductor wire;

an input wire from which an input voltage is supplied to the first external terminal of the inductor component; and an output wire to which an output voltage is supplied from the second external terminal of the inductor component, wherein a connection end of the input wire that is connected to the first external terminal and a connection end of the output wire that is connected to the second external terminal at least partially overlap when viewed in the lamination direction.

* * * * *